(12) United States Patent
Inoue

(10) Patent No.: US 6,851,043 B1
(45) Date of Patent: Feb. 1, 2005

(54) BRANCH INSTRUCTION EXECUTION CONTROL APPARATUS

(75) Inventor: Aiichiro Inoue, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/461,297

(22) Filed: Dec. 15, 1999

(30) Foreign Application Priority Data

Dec. 17, 1998 (JP) .......................................... 10-358771

(51) Int. Cl.[7] .............................................. G06F 9/38
(52) U.S. Cl. ...................................... 712/217; 712/239
(58) Field of Search ................................. 712/217, 239, 712/240, 237, 238

(56) References Cited

U.S. PATENT DOCUMENTS

| 5,632,023 | A | 5/1997 | White et al. |
| 5,634,103 | A | 5/1997 | Dietz et al. |
| 5,752,014 | A | 5/1998 | Mallick et al. |
| 5,805,853 | A | 9/1998 | White et al. |

FOREIGN PATENT DOCUMENTS

| EP | 0 376 255 | 7/1990 |
| JP | 2-173825 | 7/1990 |
| JP | 7-334364 | 12/1995 |
| JP | 9-185506 | 7/1997 |
| JP | 9-244892 | 9/1997 |
| JP | 10-133873 | 5/1998 |

OTHER PUBLICATIONS

Diep et al., "Performance Evaluation of the PowerPC 620 Microarchitecture", Proceeding of the 22nd Annual International Symposium on Computer Architecture, ACM, 1995, pp. 163–174.*
Notice of Rejection Grounds, Patent Application No. H10–358771, Reference No. 9804168, Dispatch No. 030640, Date Dispatched Feb. 3, 2004, pp. 1–4.

* cited by examiner

Primary Examiner—William M. Treat
(74) Attorney, Agent, or Firm—Staas & Halsey LLP

(57) ABSTRACT

An information processing device contains a branch instruction execution control apparatus including a branch reservation station unit as a stack waiting for a process. The branch reservation station unit generates an entry storing a branch or data required to process the branch if an instruction is decoded, and it is determined that the instruction is a branch instruction or a process is required for a branch. With the configuration, in the information processing device for executing sequentially given instructions, a process of a sequence of instructions containing a branch instruction can be performed at a high speed to process the branch instruction in an order different from an order specified by a program.

38 Claims, 31 Drawing Sheets

BC        $M_1, D_2(X_2, B_2)$        [RX]

BCR        $M_1, R_2$        [RR]

BRC        $M_1, I_2$        [RI]

BXH      $R_1$, $R_3$, $D_2(B_2)$      [RS]

| '86' | $R_1$ | $R_3$ | $B_2$ | $D_2$ |
|---|---|---|---|---|
| 0 | 8 | 12 | 16   20 | 31 |

FIG. 6A

BRXH      $R_1$, $R_3$, $I_2$      [RSI]

| '84' | $R_1$ | $R_3$ | $I_2$ |
|---|---|---|---|
| 0 | 8 | 12 | 16      31 |

FIG. 6B

| INSTRUCTION | IID |
|---|---|
| L (LOAD) | 0 |
| A (ADDITION) | 1 |
| ST (STORE) | 2 |
| BC (BRANCH) | 3 | ← CCIID OF THIS BC IS 1
| L (LOAD) | 4 |
| S (SUBTRACTION) | 5 |
| C (COMPARISON) | 6 |
| BC (BRANCH) | 7 | ← CCIID OF THIS BC IS 6
| C (COMPARISON) | 8 |

FIG. 22

BRANCH INSTRUCTION EXECUTION CONTROL APPARATUS

BACKGROUND OF THE INVENTION

1. Field of the Invention

The present invention relates to a branch instruction execution control apparatus in an information processing device for executing sequentially input instructions, and more specifically to a branch instruction execution control apparatus for controlling the execution of a branch instruction in an information processing device for sequentially referring to and updating the resources accessible from a program, that is, the contents of a storage area of memory, the register, etc. in the program instruction execution order.

2. Description of the Related Art

In an information processing device, various techniques have been used to quickly process instructions. One of those is a pipeline processing. There is a system called 'super-pipeline' for attaining high performance by realizing a high-speed machine cycle with a larger number of stages in the pipeline processing, a super-scalar system having a plurality of pipelines, etc.

The second technology is a system realized to control the execution of an instruction by providing a stack waiting for a process referred to as reservation station instead of controlling the execution of an instruction through a pipeline. In the system using the reservation station, unlike the pipeline system, the number of entries in a stack can be selected independent of the number of process steps in machine cycle units. Thus, a higher-level concurrent process can be performed by increasing the number of entries.

The third technology is an out-of-order system for aiming at higher performance. An out-of-order system refers to a system of executing instructions in an order different from the instruction order specified by a program, for example, in order from an instruction for which input data has been ready. That is, in the out-of-order system, an entry which can be processed in a stack is selected, and a process corresponding to the entry is performed in an order different from the instruction order specified by a program, thereby realizing a high-level concurrent process.

In the out-of-order system, instructions are executed in an optional order, but it is necessary to execute the instructions such that the resources accessible by a program, that is, the contents of a storage area of memory, a register, etc., can be referenced and updated in the execution order of the program.

In the information processing device for quickly processing instructions, for example, the system starts executing a sequence of instructions without waiting for the completion of the execution of a precedent instruction, and the concurrent process can improve the entire performance.

However, when the execution result of a precedent instruction has an influence on the subsequent instructions, it is necessary to sequentially process the instructions, thereby causing the performance of the information processing device to be deteriorated. A typical example is a branch instruction. When a branch instruction is used, it is not certain until the completion of the execution whether or not the branch is selected, and what the instruction address is.

To quickly process a sequence of instructions containing a branch instruction, a mechanism of executing a branch instruction in parallel with instructions other than a branch instruction is first required. Without the mechanism, instructions are sequentially processed each time a branch instruction is executed, and the hardware resources prepared for parallel execution cannot be effectively utilized, thereby deteriorating the performance.

In addition, for a high-speed process, an instruction subsequent to a branch instruction should be speculatively executed. If a branch instruction is started without such speculative execution of instructions, the execution of the instructions subsequent in execution order to the branch instruction cannot be started until the branch instruction has been completely executed, thereby interfering with the effective use of hardware resources for concurrent execution.

Thus, instructions to be speculatively executed after a branch instruction can be a sequence of instructions subsequent to the branch instruction assuming that the branch instruction is selected. Additionally, by providing a branch prediction mechanism, sequence of instructions at a branched-to address for use when a branch instruction is selected can also be instructions to be speculatively executed.

However, when instructions subsequent to a branch instruction are speculatively executed to quickly process a sequence of instructions containing the branch instruction, it is necessary to provide a mechanism for validating the speculative execution depending on the execution result of the precedent branch instruction, and a mechanism for deleting the execution of the instruction and re-executing a correct sequence of instructions if the speculative execution of an instruction is not valid. Furthermore, it is hard to improve the performance unless the information of the branch prediction mechanism can be appropriately updated depending on an execution result.

If there is another branch instruction in a sequence of instructions to be speculatively executed, and if the execution of the subsequent instructions is delayed until the branch instruction has been completely executed, then the performance of a sequence of instructions containing a larger number of branch instructions is deteriorated. In addition, if a sequence of instructions subsequent to the branch instruction in another sequence of instructions to be speculatively executed is also to be speculatively executed, then a mechanism for deleting the speculative execution result of an instruction and a mechanism for re-executing a correct sequence of instructions should be the more complicatedly designed.

SUMMARY OF THE INVENTION

The present invention aims at providing a branch instruction execution control apparatus capable of processing a sequence of instructions containing a branch instruction at a high speed by providing a reservation station, that is, a stack waiting for a process, in which an entry is generated for a branch instruction, selecting an entry which can be processed in the stack, and executing instructions at any time in an order different from the instruction order specified by a program.

The branch instruction execution control apparatus according to the present invention is provided in an information processing device for executing sequentially given instructions, and controls the execution of a branch instruction. In addition, the branch instruction execution control apparatus includes a branch reservation station unit for generating an entry storing a branch or data required to process the branch if an instruction is decoded, and it is determined that the instruction is a branch instruction or a process is required for a branch.

According to an aspect of the present invention, the branch reservation station unit contains, that is, in an entry, storage areas for a flag indicating that a branch is determined/not determined, and a flag indicating that the branch has been selected/not selected. If it is certain when an instruction is decoded that the branch is selected/not selected, a generated entry contains the value of the flag indicating that the branch has been determined and the flag indicating that the branch has been selected/not selected. If it is not certain when an instruction is decoded that the branch is selected/not selected, the generated entry contains the value of the flag indicating that the branch is not determined. If it is not certain when an instruction is decoded that the branch is selected/not selected, then it is first determined that the branch is selected/not selected, and then a value of the flag indicating that the branch has been selected/not selected is stored depending on the determination result regardless of the execution order of the instructions. With the above described configuration of the branch instruction execution control apparatus, a sequence of instructions containing a branch instruction can be processed at a higher speed.

BRIEF DESCRIPTION OF THE DRAWINGS

FIGS. 6A and 6B show the format of a branch on index high instruction;

FIG. 22 shows an example of a sequence of instructions for explanation of the operation of the pending condition coding unit shown in FIG. 20;

DESCRIPTION OF THE PREFERRED EMBODIMENT

The embodiments of the present invention are described below in detail by referring to the attached drawings.

Figure 1:
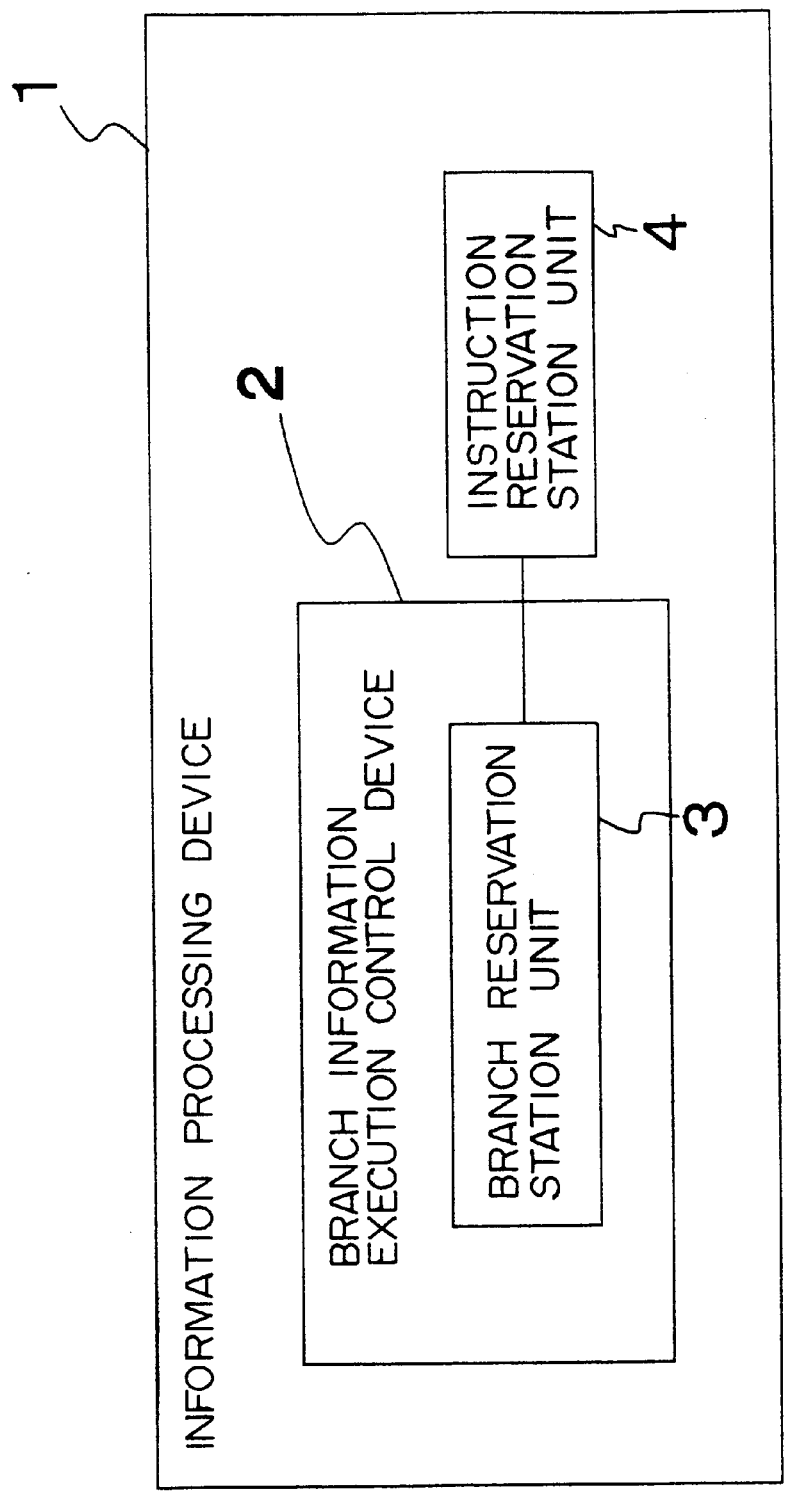
FIG. 1 is a block diagram of the configuration showing the principle of the present invention.

FIG. 1 is a block diagram of the configuration according to the principle of the present invention. FIG. 1 shows the configuration of an information processing device 1 which executes sequentially given instructions, and comprises a branch information execution control device 2 according to the present invention.

When an instruction is decoded, and it is determined that the instruction is a branch instruction or a process relating to a branch is required, a branch reservation station unit 3 provided in the branch information execution control device 2 generates an entry storing the branch instruction or the necessary data for executing a process relating to the branch.

According to the embodiment of the present invention, the branch reservation station unit 3 contains in its entry storage areas of a flag indicating that a branch is determined/not determined, and a flag indicating that the branch is selected/not selected. If it is certain when an instruction is decoded that the branch is selected/not selected, a generated entry contains the value of the flag indicating that the branch has been determined and the flag indicating that the branch has been selected/not selected. If it is not certain when an instruction is decoded that the branch is selected/not selected, the generated entry contains the value of the flag indicating that the branch is not determined.

If it is not certain when an instruction is decoded that the branch is selected/not selected, then it is first determined that the branch is selected/not selected, and then a value of the flag indicating that the branch has been selected/not selected is stored depending on the determination result regardless of the execution order of the instructions.

In an embodiment according to the present invention, when an instruction is decoded, and it is determined that an instruction preceding the decoded instruction which has an influence on whether the decoded instruction is selected/not selected has not been completely executed, an entry to be generated can store the data indicating that the preceding instruction has not been completely executed, and the data identifying the preceding instruction.

In an embodiment according to the present invention, the branch information execution control device 2 comprises a branch selection/non-selection prediction unit, an instruction speculative execution unit, and an instruction re-execution unit. When a branch instruction is decoded, the branch selection/non-selection prediction unit predicts whether a branch instruction is selected/not selected, and provides the prediction result to the branch reservation station unit 3 as a value, to be stored in the entry generated by the branch reservation station unit 3, of the flag indicating whether the branch is selected/not selected.

The instruction speculative execution unit speculatively executes instructions, including the branch instruction and the instructions after the branch instruction, based on the prediction result from the branch selection/non-selection prediction unit. The instruction re-execution unit nullifies the instruction execution result obtained by the instruction speculative execution unit when there arises inconsistency between the value of the flag, stored in the branch reservation station unit 3, indicating whether the branch is selected/not selected and an actual determination result as to whether the branch is selected/not selected, thereby executing an instruction corresponding to the actual determination result.

In an embodiment according to the present invention, the branch selection/non-selection prediction unit predicts whether a branch is selected/not selected, performs an operation of storing a prediction value for a branched-to address in an entry generated by the branch reservation station unit 3 when it is predicted that the branch is selected, nullifies the instruction execution result obtained by the instruction speculative execution unit when the prediction value of the branched-to address does not match an actually obtained branched-to address, and executes the instructions including the instruction at an actually obtained branched-to address and the subsequent instructions.

In an embodiment according to the present invention, the information processing device 1 can comprise an instruction reservation station unit 4 as shown in FIG. 1. The instruction reservation station unit 4 collectively controls the execution of instructions to process the instructions sequentially given to the information processing device 1 in the out-of-order system.

For example, the branch reservation station unit 3 has a plurality of entries storing a branch instruction or data required to execute a process relating to a branch, an entry is generated in an instruction execution order when an instruction is decoded, and the entry stores an instruction identifier identifying the information specified by the instruction reservation station unit 4 and decoded.

When the branch process is completely performed for the generated entry, the entry corresponding to the instruction for which the branch process is completely executed is removed in the instruction execution order, for example, after the branch reservation station unit 3 reports the completion of the branch process with the information as to whether the branch has been selected/not selected and with an instruction identifier.

In an embodiment according to the present invention, if it is not determined whether a branch is selected/not selected when an instruction is decoded, then the instruction speculative execution unit for speculatively executing the instructions after the decoded instruction is further provided, and the branch reservation station unit 3 can comprise a plurality of entries storing a branch instruction or the data required to execute a process relating to the branch, thereby generating an entry in the instruction execution order when the instruction is decoded. When it is necessary to nullify the execution result of an instruction by the instruction speculative execution unit, the entry generated as a result of the instruction execution by the instruction speculative execution unit is immediately removed.

In an embodiment according to the present invention, the branch selection/non-selection prediction unit can be provided to predict corresponding to a branch instruction whether a branch is selected/not selected when the branch instruction is decoded. When a branch process corresponding to the entry generated in the branch reservation station unit 3 is completely performed, the branch reservation station unit 3 reports to the branch selection/non-selection prediction unit about the determination result as to whether the branch has been selected/not selected, the branched-to address used when the branch is selected, and the matching/non-matching between the prediction and actual branch determination result. According to the report, the branch selection/non-selection prediction unit updates the data stored in itself for prediction.

As described above, according to the present invention, the branch reservation station unit 3 generates an entry corresponding to each branch instruction, and the instruction process is performed in an out-of-order system sequentially on an instruction which has become ready for an actual process. When the process on the branch instruction has been completed, the completion is reported to the instruction reservation station unit 4 in the instruction execution order.

Figure 2:
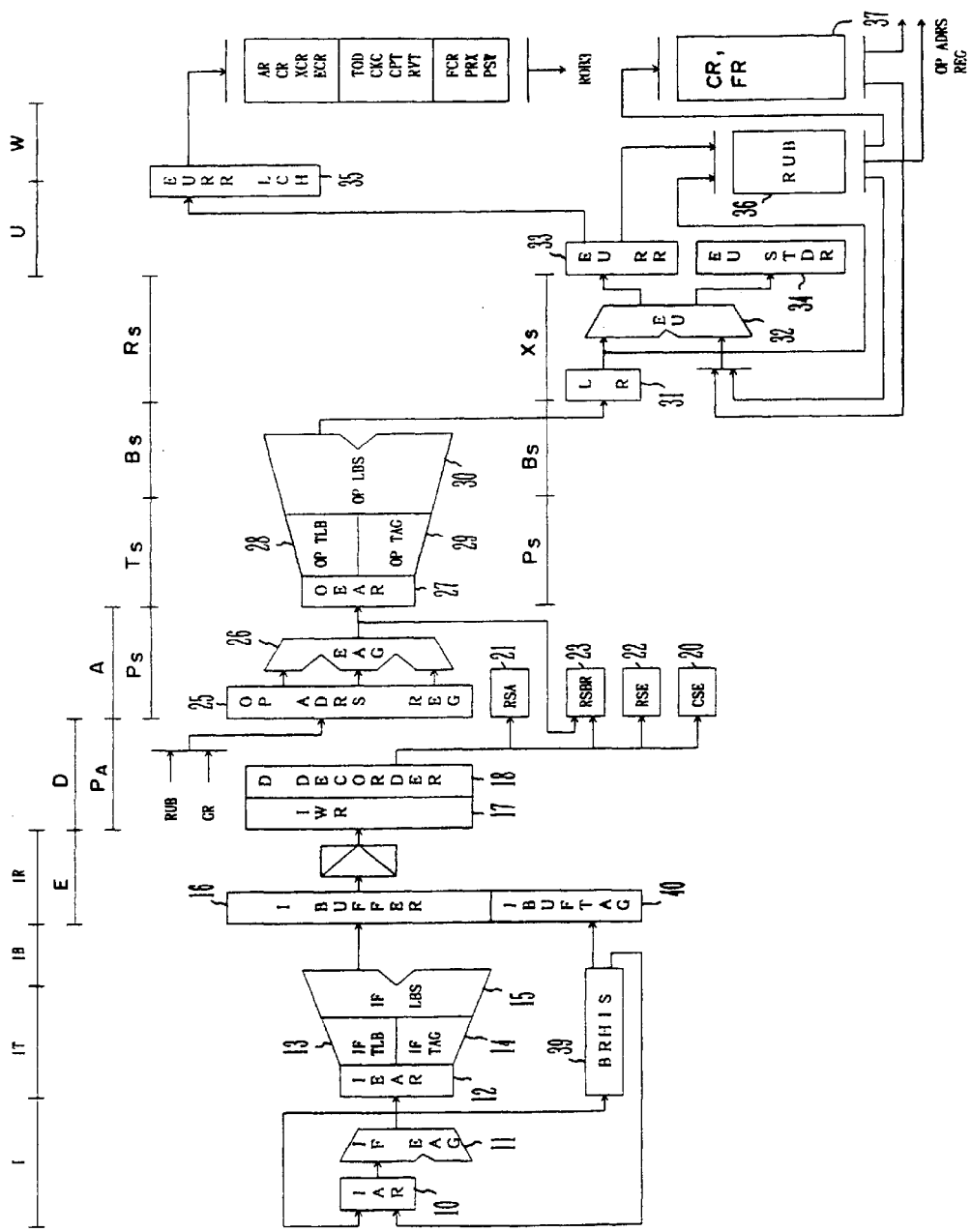
FIG. 2 is a block diagram of the entire configuration of the information processing device provided with the branch reservation station (RSBR) according to the present invention.

FIG. 2 is a block diagram of the entire configuration of the information processing device provided with a branch reservation station according to the present invention.

In FIG. 2, an instruction address register (IAR) 10, an instruction fetch effective address generator (IFEAG) 11, an instruction effective address register (IEAR) 12, an instruction fetch translation look-aside buffer (IFTLB) 13, an instruction fetch tag (IFTAG) 14, and an instruction fetch local buffer storage (IFLBS 15) are used for performing a pipeline operation as a partial pipeline when an instruction is fetched in the information processing device according to the present invention.

The instruction fetch pipeline includes an instruction fetch request issue cycle I, a tag and TLB access cycle IT, a buffer access cycle IB, and a fetch completion cycle IR. An instruction fetched from the main storage is provided also for an instruction buffer 16.

The instruction transmitted to the instruction buffer 16 is decoded by an instruction word register 17 and a decoder 18 in an instruction decoding pipeline. The pipeline includes an instruction presentation cycle E, and a decoding cycle D.

When the decoding cycle is completed (D release), an entry is generated in a commit stack entry (CSE) 20 corresponding to the instruction reservation station. Simultaneously, necessary entries are generated in a reservation station for address generation (RSA) 21 which is a reservation station for generating a main storage operand address corresponding to an instruction decoding result, a reservation station for execution (RSE) 22 which is a reservation station for arithmetic operations, and a reservation station for branch (RSBR) 23 corresponding to a branch reservation station.

Normally, the number of entries in each of the RSA 21, the RSE 22, and the RSBR 23 is smaller than the number of entries in the CSE 20. For example, the number of entries is 16 for the CSE 20, 6 for the RSA 21, 8 for the RSE 22, and 8 for the RSBR 23.

When there is no space for an entry in each reservation station in which an entry is to be generated as a result of decoding an instruction when the decoding cycle is completed (D release), the instruction is held in the instruction word register 17, and an entry is generated in the CSE 20 and a necessary reservation station when there is space in a necessary entry. Therefore, a resource counter is provided corresponding to each reservation station so that a value is incremented when an entry is generated, and the value of a pointer is decremented when a process for the entry is completed.

An in-pointer is provided for the CSE 20, and the number of the entry generated in the CSE 20 when the decoding cycle is completed is specified by the value of the in-pointer. This number is entered in the corresponding entry in each reservation station, and is used to uniquely identify an instruction being processed with the instruction execution order.

An in-pointer different from that for the CSE 20 is assigned to the reservation station for branch RSBR 23, and an entry is generated at the position specified by the in-pointer. On the other hand, since the out-of-order process is basically performed on the RSA 21 and the RSE 22, an available entry is searched for in the reservation station, thus generating an entry.

The CSE 20 is provided with an out-pointer whose value is incremented when the entry is released. The leading entry pointed to by the out-pointer is recognized as the first entry in the execution order in the incomplete instructions being executed. The update of the programmable resources executed before releasing the entry is executed in order from the instructions pointed to by the out-pointer, thereby guaranteeing the update order of the resources according to the instruction execution order.

Similarly, the RSBR 23 is provided with an out-pointer, but a branch is determined in the out-of-order system. On the other hand, a branch completion report to the CSE 20 is issued sequentially from the entry pointed to by the out-pointer.

As for the process order of the entries in the RSA 21 and the RSE 22, the process is performed in an optional order among executable entries. When there are a plurality of executable entries, the process is performed in the execution order.

FIG. 2 shows a branch prediction mechanism for a branch instruction, that is, a branch history (BRHIS) 39 for predicting whether a branch is selected/not selected, and obtaining a prediction value of a branched-to instruction address (target address) when a branch is considered to be selected, and also shows an instruction buffer tag unit (IBUFTAG) 40 for receiving the prediction result output by the BRHIS 39, and transmitting the result to the decoder 18 through the instruction word register (IWR) 17.

When an instruction is a branch instruction, the BRHIS 39 stores control data such as the indication whether a branch is selected/not selected depending on the previous execution result of the instruction, a target address for use when the branch is selected, a giddy bit described later, a diggy bit, etc. corresponding to the address of the instruction output by the IFEAG 11. When instructions having the same addresses are given, the data relating a branch is transmitted to the IBUFTAG 40, and, when it is estimated that the branch is selected, a target address is assigned to the IAR 10 so that the instructions after the branched-to instruction can be speculatively executed.

In FIG. 2, after the instruction decoding pipeline operation (E–D), the operations of an address computation pipeline, a storage control (S) unit (cache access) pipeline, an operation executing pipeline, and a resource update pipeline are performed as necessary.

The address computation pipeline comprises an address generation priority cycle $P_A$, and an address generation cycle A. The S unit pipeline comprises a priority cycle $P_S$, an access cycle $T_S$ to a tag and a TLB, a buffer access cycle $B_S$, and a completion cycle $F_S$. The operation executing pipeline comprises a priority cycle $P_E$, a buffer access cycle $B_E$, and an execution cycle $X_E$. The resource update pipeline comprises an update cycle U and a write cycle W.

Figure 3:
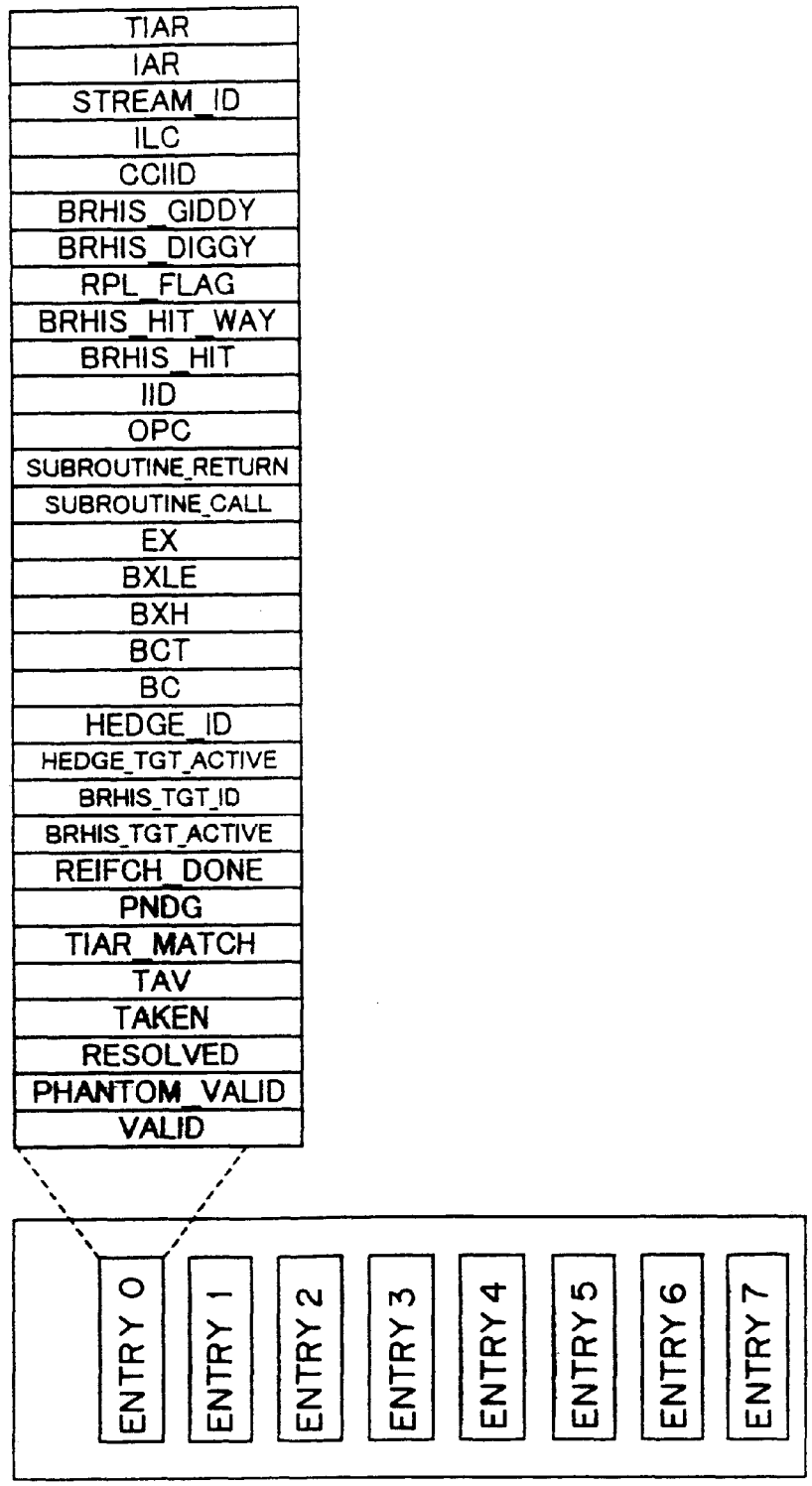
FIG. 3 shows an example of the contents stored in each entry of the RSBR.

Since the process performed using these pipelines are not directly related to the present invention, the detailed explanation about them is skipped here, and described below is the RSBR as the most important component according to the present invention. FIG. 3 shows the contents stored in each entry of the RSBR. In the present embodiment, it is assumed that the RSBR 23 contains eight entries 0 through 7.

The first field contains VALID (1 bit) indicating that the entry is valid. This bit is not set for a phantom branch. A phantom branch refers to an instruction which is not actually a branch instruction, but has been recognized as a hit because the BRHIS 39 contains wrong information. The hit is detected by retrieving the BRHIS 39 by a part of an instruction address, by the memory storing different instructions depending on a process switch, etc. For simple hardware, an EX (execute) instruction is processed as a phantom branch.

The second field contains PHANTOM VALID (1 bit) indicating that the entry contains a phantom branch instruction.

The third field contains RESOLVED (1 bit) indicating that it is determined that a branch has been selected/not selected.

The fourth field contains TAKEN (1 bit) indicating that a branch corresponding to the entry has been selected.

The fifth field contains TAV (target address valid) (1 bit) indicating that the 31st TIAR field, which is the last field, that is, a field indicating that a field for the branched-to address contains a valid value.

The sixth field contains TIAR_MATCH (target instruction address match) (1 bit) indicating that the target address obtained from the BRHIS 39 matches the target address computed by an effective address generator (EAG) 26 using an operand of a branch instruction.

The seventh field contains PNDG (pending) (1 bit) indicating that the contents of the condition code (CC) for determination as to whether a branch is selected/not selected are not certain when an entry of the RSBR is assigned, that is, when an instruction is decoded.

The eighth field contains REIFCH-DONE (re-instruction-fetch done) (1 bit). This bit indicates that, if an instruction is detected as a hit in the BRHIS 39, a sequence of instructions after the branched-to address, that is, the target address, are speculatively executed, but the target address does not match the address computed by the EAG 26 using an operand, and the branched-to instruction of the branch instruction is not to be re-executed but the instructions subsequent to the non-selected branch are to be re-executed, then the instructions subsequent to the non-selected branch are re-fetched, and the instruction which is in the instruction execution unit when the branch process is completed and is not to be executed should be cleared. The instruction re-fetching process is described later.

The ninth field contains HRHIS_TGT_ACTIVE (branch history target active) (1 bit) indicating that a sequence of instructions pointed to by the target address of the branch history have been fetched in the instruction buffer.

The tenth field contains BRHIS_TGT_ID (branch history target ID) (2 bits) indicating the ID of the instruction fetch port in which the sequence of instructions pointed to by the target address of the branch history is stored. In this example, it is assumed that there are three instruction fetch ports, and two bits are required as the ID.

The eleventh field contains HEDGE_TGT_ACTIVE (hedge target active) (1 bit) indicating that the branched-to target address has been fetched by a hedge fetch into the instruction buffer. A hedge fetch indicates that a sequence of branched-to instructions are preliminarily fetched into the instruction buffer although a branch instruction is not detected as a hit in the branch history, and it is not determined when the instruction is decoded whether the branch is selected/not selected. Since the instruction is not detected as a hit in the branch history, the decoder is assigned the instructions subsequent to the branch instruction, that is, the instructions after the non-selected branch. The sequence of instructions at the branched-to address is fetched only, but not assigned to the decoder. When it is certain that the branch is selected, the contents of the instruction execution unit are cleared, and the sequence of instructions at the branched-to address is assigned to the decoder. If it is certain that the branch is not selected, then the contents of the instruction fetch port containing the sequence of instructions at the branched-to address are nullified.

The twelfth field contains HEDGE_ID (head target ID) (2 bits) indicating the ID of the instruction fetch port storing the hedge-fetched sequence of instructions.

The thirteenth field contains BC (1 bit) indicating that the instruction in the entry is a branch-on-condition (BC, BCR, BRC) instruction. The contents of the instruction are described later.

The fourteenth field contains BCT (1 bit) indicating that the instruction in the entry is a branch on count (BCT, BCTR, BRCT) instruction.

The fifteenth field contains BXH (1 bit) indicating that the sequence of instructions in the entry is a sequence of branch-on-index-high (BXH, BRXH) instructions.

The sixteenth field contains BXLE (1 bit) indicating that the instruction in the entry is a branch-on-index-low-or-equal (BXLE, BRXLE).

The seventeenth field contains EX (1 bit) indicating that the instruction in the entry is an EX (execute) instruction.

The eighteenth field contains SUBROUTINE_CALL (1 bit) indicating that the branch instruction corresponding to the entry is used to call a subroutine.

The nineteenth field contains SUBROUTINE_RETURN (1 bit) indicating that the branch instruction corresponding to the entry is used to return from a subroutine.

The twentieth field contains OPC (4 bits) which is an OP code indicating the mask field of the instruction in the entry. The mask field is described later.

The twenty-first field contains IID (instruction identifier) (4 bits) indicating the instruction ID of the instruction in the entry. The identifier is assigned corresponding to the entry of the CSE 20.

The twenty-second field contains BRHIS_HIT (branch history) (1 bit) indicating that the instruction is detected as a hit in the BRHIS 39, for example, an instruction predicted to be selected.

The twenty-third field contains BRHIS_HIT_WAY (branch history hit way) (1 bit) indicating in which way of the branch history the instruction is detected as a hit.

The twenty-fourth field contains RPL_FLAG (replace flag) (2 bits) indicating a replace flag of the branch history. The replace flag is information for use in updating according to the predetermined algorithm the contents of the branch history in response to the completion report from the RSBR 23 when the branch history has a two-way configuration.

The twenty-fifth field contains HRHIS_DIGGY (branch history diggy hit) (1 bit) in the branch history. The diggy hit can be detected in the branch history, but cannot be detected next time, and then can be detected again. Thus, the hit can be alternately detected.

The twenty-sixth field contains BRHIS_GIDDY (1 bit) indicating the giddy hit. This giddy bit indicates that a branched-to address, that is, a target address frequently changes.

The twenty-seventh field contains CCIID (condition code IID) (4 bits) indicating the instruction identifier of an instruction preceding the instruction corresponding to an entry, and updating the condition code in the instruction corresponding to the entry. That is, the identifier CCIID is the identifier of an instruction preceding a branch instruction and changing the condition code for the branch instruction.

The twenty-eighth field contains ILC (instruction length code) (2 bits) indicating the instruction word of the instruction corresponding to the entry.

The twenty-ninth field contains STREAM_ID (2 bits) indicating from which instruction fetch port the instruction corresponding to the entry has been fetched.

The thirtieth field contains IAR, that is, the contents of the instruction address register indicating the instruction address of the instruction in the entry. The number of bits is 30 bits+4P bits as parity bits. According to the present embodiment, it is assumed that only even number addresses are allowed, and the address is represented by 30 bits, not 31 bits.

The thirty-first field contains TIAR (target instruction address register) (31+4P bits) indicating the branched-to address.

Figure 4A:
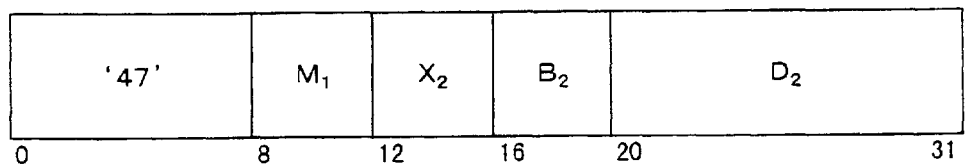
FIGS. 4A through 4C show the format of a branch on condition instruction.
Figure 4B:
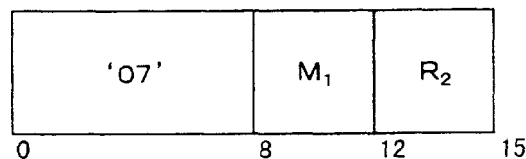
Figure 4C:
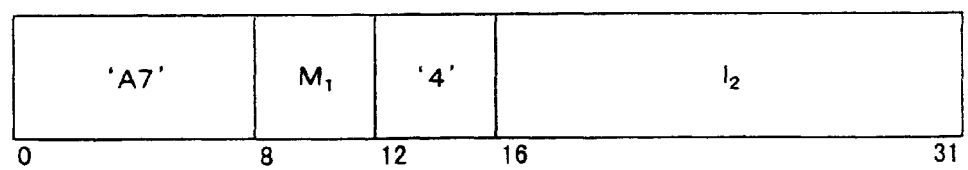

FIGS. 4A through 4C show the instruction format of the branch on condition instruction used in the embodiment of the present invention. FIG. 4A shows a BC instruction where 47 is an instruction code, $M_1$ is a mask, $X_2$, $B_2$, and $D_2$ are the second operand addresses. A branch is selected when the contents of the mask $M_1$ matches the condition code (CC), and the second operand is used as a branched-to address.

In the conditional branch instruction, the four bits of mask field respectively correspond to the values 0, 1, 2, and 3 of the condition code. If the value of the condition code corresponds to the bit '1' of the mask field, then the branch is selected. For example, if the mask field of four bits is 1000, and the condition code is 0, then the branch is selected.

The BCR instruction shown in FIG. 4B is similar to the BC instruction. However, when a branch is selected, the contents of the general-purpose register specified by the second operand $R_2$ are used in generating a branched-to address. If the contents of this field are zero (0), the branch is not selected unconditionally.

FIG. 4C shows the instruction format of a branch-relative-on-condition (BRC) instruction. In this format, the branch is selected when the contents of the mask $M_1$ match the condition code. When a branched-to address is generated, the value to be added to the current instruction address is specified by the contents of the $I_2$ field, and the branched-to address is generated.

Figure 5A:
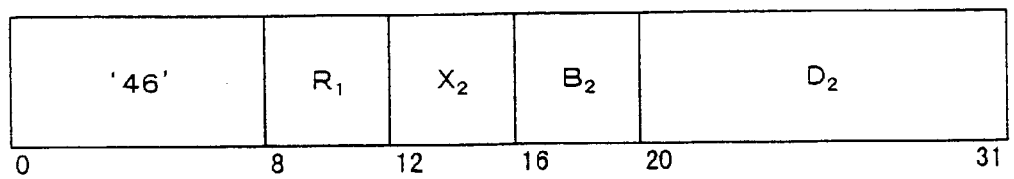
FIGS. 5A through 5C show the format of a branch on count instruction.
Figure 5B:
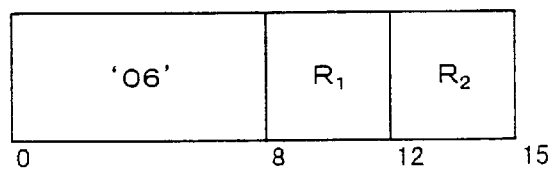
Figure 5C:
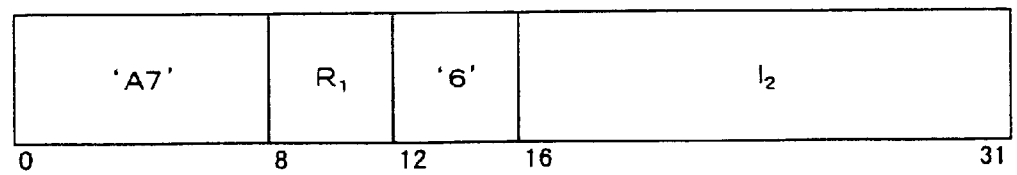

FIGS. 5A through 5C show the instruction format of the branch-on-count instruction. In the BCT instruction shown in FIG. 5A, 1 is subtracted from the contents of the first operand $R_1$, and the result is stored as $R_1$ again. If the result is not zero (0), the branch is selected and the branched-to address is assigned by the $X_2$, $B_2$, and $D_2$.

In the BCTR instruction shown in FIG. 5B, 1 is subtracted from the first operand $R_1$. When the result is not zero (0), the branch is selected. The branched-to address is assigned as the contents of the general-purpose register specified by the second operand $R_2$. When the $R_2$ field is zero (0), the branch is not selected unconditionally.

Similarly, in the BRCT instruction shown in FIG. 5C, 1 is subtracted from the contents of $R_1$. If the result is not 0, the branch is selected. The branched-to target address is obtained based on the contents of the $I_2$ field as in the BRC instruction.

FIGS. 6A and 6B show the instruction format of the branch-on-index-high instruction. FIG. 6A shows a BXH instruction. An increment value is added to the contents of the first operand $R_1$, and the result is compared with the comparison value. When the sum is larger than the comparison value, the branch is selected. The $R_3$ field specifies the register containing the increment value and the comparison value, and the branched-to address is specified by the second operand address, that is, $B_2$ and $D_2$.

FIG. 6B shows the instruction format of the BRXH instruction. When it is compared with the BXH instruction, it is only different in that the branched-to address can be obtained based on the contents of the $I_2$ field as in the BRC and BRCT instructions.

The instruction formats of the BXLE and BRXLE instructions as branch-on-index-low-or-equal instructions are the same as those of the BXH and BRXH instructions. In the BXLE and BRXLE instructions, the branch is selected when the sum of the first operand and the increment value is equal to or smaller than the comparison value. The branched-to address is similarly generated as in the case of the BXH and BRXH instructions.

In the BAS, BASR, and BRAS instructions such as branch and save instructions, a branch is executed after the information from the current program status word (PSW) containing the updated instruction address, for example, the bits 32 through 63 of the PSW have been loaded to the position of the first operand as relevant information. In this respect, these instructions are basically unconditional branch instructions. In the BAS instruction, the address of the second operand is used as a branched-to address. In the BASR instruction, the contents of the general purpose specified by the second operand $R_2$ are used for generation of the branched-to address. At this time, when the contents of the field is zero (0), the branch is not selected. In addition, in the BRAS instruction, for example, as in the BRC instruction, the branched-to address is obtained based on the contents of the $I_2$ field.

The BAL and BALR instructions as branch-and-link instructions replace the BAS and BASR instructions corresponding to the address designation mode. Their instruction formats are the same as those of the BAS and BASR instruction, and the detailed description is omitted here.

Figure 7:
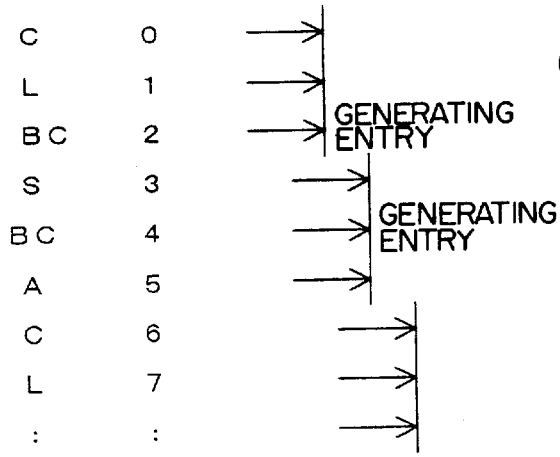
FIG. 7 shows an example of sequentially given instructions.

The reason for the necessity of the instruction identifier CCIID of the condition code update instruction stored in the twenty-seventh entry shown in FIG. 3, and the improvement of the process speed by the concurrent execution of instructions in the out-of-order system are described below by referring to FIG. 7. In FIG. 7, the identifier IID for identifying each instruction is provided by the commit stack entry CSE 20 for the instructions sequentially assigned to the information processing device. The value is '0' for the initial comparison instruction C, '1' for the load instruction L, '2' for the branch-on-condition instruction BC, '3' for the store instruction S, . . .

According to the present embodiment, assuming that three instructions are simultaneously decoded on one cycle, the third instruction BC in the initial three instructions is a branch instruction. Therefore, when the information is decoded, an entry corresponding to the instruction can be generated for the RSBR 23. The contents of the condition code CC for the instruction BC are assigned by the result of the initial comparison instruction C.

Similarly, an entry is generated in the RSBR 23 for the second branch-on-condition instruction BC in the next three instructions. The contents of the condition code for this instruction are provided corresponding to the execution result of the subtraction instruction S immediately before the instruction. On this cycle, the three instructions to the third addition instruction A are simultaneously decoded. Thus, the subsequent three instructions are simultaneously decoded.

As a result of the concurrent execution of an instruction, among the above described instructions, the load instruction having the IID of 1 is first executed, and then the subtraction instruction S having the IID of 3 is executed.

The subtraction instruction S determines the contents of the condition code for the next branch-on-condition instruction BC, and the entry for the BC instruction stores '3' for the subtraction instruction S as a CCIID. By reporting with the IID=3 from an operations unit that the instruction execution has been completed, the RSBR 23 is informed that the contents of the condition code for the BC instruction have been determined, and the instruction can be executed.

Next, assuming that the addition instruction A having the IID of 5, and the comparison instruction C having the IID of 0 are executed in this order, the comparison instruction C determines the contents of the condition code of the branch-on-condition (BC) instruction having the IID of 2, and is executed to make the BC instruction having the IID of 2 executable. Although the BC instruction having the IID of 4 has been completely executed before this instruction, the completion report about the BC instruction having the IID of 2 is first issued, and then the completion report about the BC instruction having the IID of 4 is issued because the completion report to the CSE 20 is issued according to the instruction execution order.

Thus, by storing in the entry the instruction identifier as a CCIID for a precedent instruction for determination of the contents of the condition code for the BC instruction, the termination of the precedent instruction can be immediately informed of, and an executable branch instruction can be executed regardless of the instruction execution, thereby improving the entire instruction process speed of the information processing device.

Then, the operation of the RSBR 23 is described below in association with an instruction provided for the information processing device and the data in the processing device. As shown in FIG. 3, the RSBR 23 holds the information relating to a branch. According to the information, a branch is determined, an instruction is re-fetched, a branch history is updated, and a branch result is reported to the CSE 20.

First, an instruction assigned to the entry of the branch reservation station unit 3 is described below. In the above described BC, BCR, BCT, BCTR, BXH, BXLE, BRAS, BRC, BRCT, BRXH, BRXLE, BAL, BALR, BAS, BASR instructions, an instruction for which it can be determined whether or not a branch is selected on a cycle of decoding an instruction, or for which it cannot be determined whether a branch is selected/not selected in a decoding cycle is assigned an RSBR entry. For other instructions, an instruction detected as a hit in a branch history (including a phantom branch), and an EX instruction are assigned an entry. An entry is assigned to the EX instruction because the EX instruction has a format similar to that of a branch instruction, and a target instruction is specified by an operand. That is, the format of the EX instruction is the same as the format in which a target instruction is specified. That is, it is similar with the case in which a branch is selected by a branch instruction. In this respect, the EX instruction is also assigned an entry.

When the mask is zero (0) in each of the BC, BCR, and BRC instructions as instruction which can be determined whether a branch is selected/not selected on a decoding cycle, or when the second operand is zero (0) in each of the BCR, BCTR, BASR, and BALR instructions, no entries are assigned to the above described instructions. When it is mistakenly predicted that a branch is selected, the instruction is processed as a phantom branch.

Figure 8:
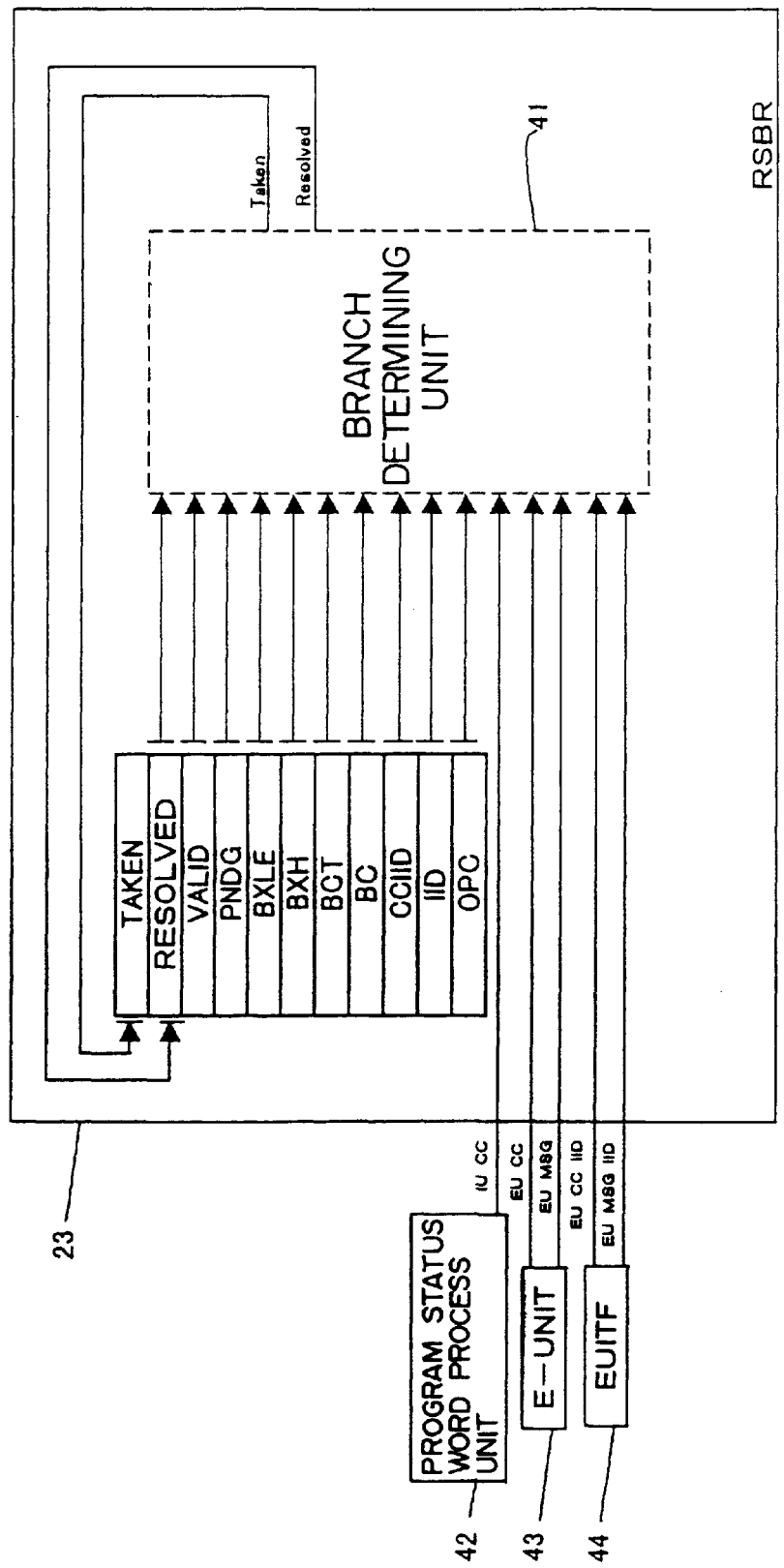
FIG. 8 shows a branch determination made by a branch determining unit in the RSBR.

The determination as to whether a branch is selected/not selected is described below by referring to FIG. 8. FIG. 8 shows the determination of a branch using various data by a branch determining unit 41 in the RSBR 23. The practical configuration of the branch determining unit 41 is described later.

In addition to providing necessary data shown in FIG. 8 in each entry of the RSBR 23, a condition code IU CC is provided from a program status word process unit (PSW) 42. The condition code is held by an instruction control unit, and is used in determining whether a branch is selected/not selected on the A cycle of the address computation described later.

An E unit 43 and an E unit interface 44 forms an operations unit, and provides an EUCC, an EUMSG, an EUCC-IID, and an EUMSG-IID for the branch determining unit 41. That is, when the operations are completed, the operations unit provides the identifier EUCC-IID of the completed instruction, and the condition code EUCC for the branch determining unit 41. Furthermore, as necessary, it provides a message EUMSG and its identifier EUMSG-IID for the branch determining unit 41.

There are the following three groups of branch instructions for which an entry is assigned to the RSBR 23. The first instruction is an unconditional branch instruction. For this instruction, it is determined on the instruction decoding cycle that a branch is selected. When an entry is assigned, the taken bit of the entry is set to 1. The BAS, BRAS, and BAL instructions are unconditional branch instructions. Furthermore, the BC and BRC instructions having the first operand of F, the BCR instruction having the first operand of F, and the second operand of a value other than 0, and the BASR and BALR instructions having the second operand of a value other than 0 belong to the first group.

The second group contains instructions for which a branch is determined based on a condition code. The instructions in this group is classified into two sub-groups, that is, a sub-group in which a condition code is determined when an instruction is decoded, and another sub-group in which it is not determined.

With the instructions in this group, a branch is determined based on the comparison between the first operand, that is, a mask field, and a condition code CC. The BC and BRC instructions having the first operand other than 0 or F, and the BCR instruction having the first operand other than 0 or F, and the second operand other than 0 are determined for a branch based on a condition code.

When a condition code is determined (PNDG=0) on a decoding cycle, a branch is determined on the A cycle of the address computation, and a taken bit is set depending of the determination result. It is possible to determine a branch on the D cycle of decoding in principle. However, since the process becomes heavy, a branch is determined on the A cycle according to the present embodiment.

When the value of the CC is not certain on the D cycle (PNDG=1), a branch is not determined until the contents of the CC becomes certain. The above described CCIID field is prepared in an entry so that a branch can be determined immediately after the condition code is determined. In this process, when the IID of the precedent instruction for update of the condition code of a branch instruction is indicated, and the PNDG bit is 1, the value of the CCIID is compared with the EUCC_IID indicating the identifier of the instruction, transmitted from the operations unit, for which an arithmetic operation has been completed. Thus, it is monitored whether or not the condition code has been completely updated. Immediately after the CC is determined, a branch is discriminated, and a taken bit is set depending on the discrimination result.

A third group contains instructions for which a branch is determined based on an operand computation result. The branch is determined based on a result of an addition or a subtraction performed on an operand of the branch instruction itself. The BCT, BXH, BXLE, BRCT, BRXH, and BRXLE instructions, and the BCTR instruction having the second operand other than 0 belong to this group. A branch is determined after the operations unit completes the operation. Based on the determination result, a taken bit is set. Since a process by the operations unit is required, a branch is necessarily determined after the D cycle.

Described below is the process of determining whether or not the branched-to target address stored in the entry is valid when an instruction is decoded, and is detected as a hit in the BRHIS 39, For a case in which a branched-to address has been changed, it is necessary to determine whether or not the target address obtained from the branch history 39 actually points to a correct jumped-to address. When a correct target address is computed from an instruction operand by the effective address generator (EAG) 26, the computed value is compared with the target address obtained from the branch history 39, and stored in the entry. When they match each other, the TIAR-MATCH bit is set to 1. If they do not match each other, the bit is set to 0, and the computation result obtained by the EAG 26 is stored in the TIAR.

Figure 9:
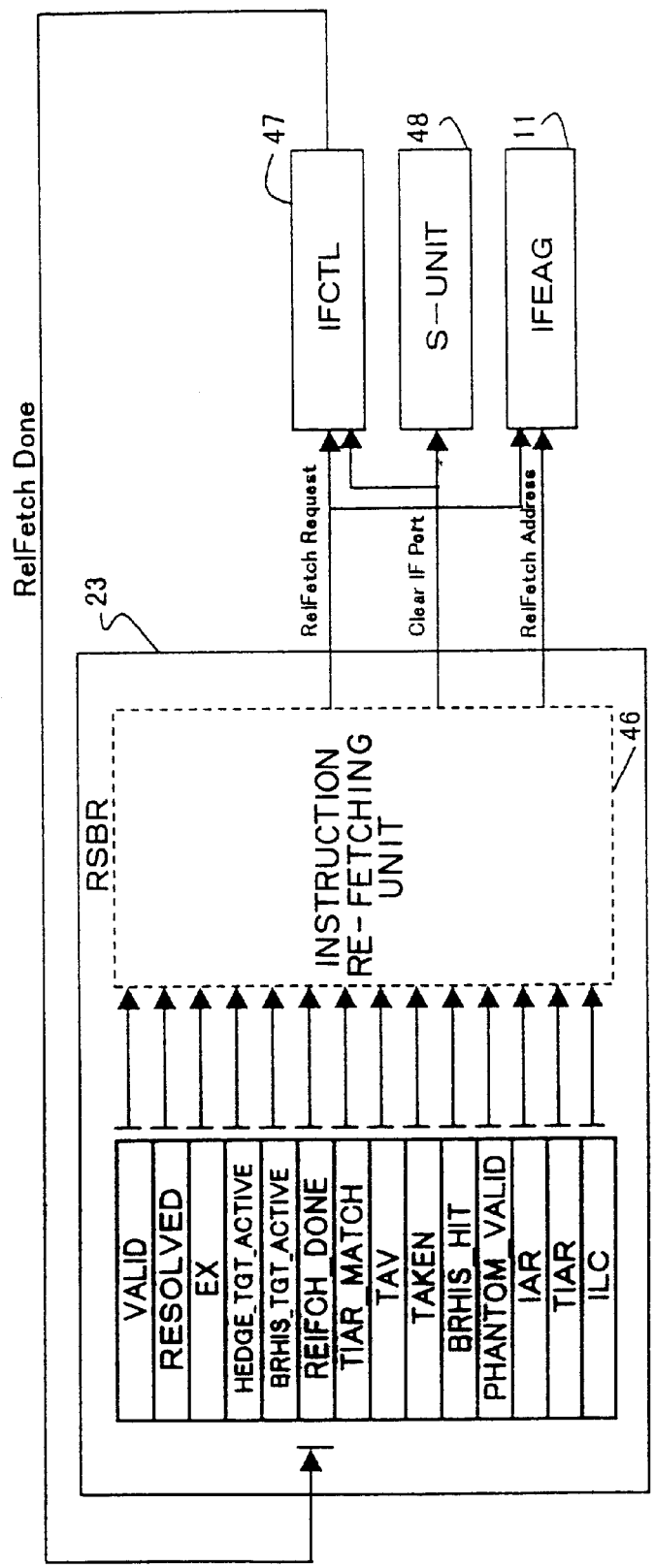
FIG. 9 shows the operation of an instruction re-fetching unit in the RSBR.

Next, in the RSBR process, the process of specifying an instruction re-fetching operation is described below by referring to FIG. 9. In FIG. 9, when it is necessary to re-fetch an instruction using various data in the entry of the RSBR 23, an instruction re-fetching unit 46 provides an instruction re-fetching address for the instruction fetch effective address generator (IFEAG) 11 shown in FIG. 2, issues an instruction re-fetch request to an (IFCTL) 47, and also provides a signal for use in clearing an instruction fetch port for a storage control (S) unit 48.

The instruction re-fetch refers to completely clearing the contents of the instruction buffer 16, and fetching the sequence of instructions specified at the specified instruction address into an instruction buffer. The RSBR 23 issues a designation such that an instruction can be re-fetched in the following cases (1) through (6).

(1) An instruction is detected as a hit in the branch history, but a branch for the instruction is not selected.
(2) An instruction is detected as a hit in the branch history, and a branch for the instruction is selected, but the target address stored in the branch history does not match the correct value computed by the EAG 26.
(3) An instruction is detected as a hit in the branch history, and a branch for the instruction is selected, but an operation of fetching a target instruction to the instruction buffer 16 is not started.
(4) A branch which is not detected as a branch history in the branch history is selected, and the hedge fetch for the branch is not performed.
(5) When a target instruction of an EX instruction is used, the target instruction is specified by an operand of the EX instruction as described above, and a jump to the target instruction is required.
(6) When an instruction subsequent to the EX instruction is used, an instruction fetch is required to return to the instruction at the original position after the execution of the target instruction for the EX instruction.

(1) and (2) show the cases in which a predicted branch is not selected, and an instruction is to be re-fetched. (3) shows the case in which a predicted branch is actually selected, but the operation of fetching a target instruction is not started for any reason, and therefore, it is determined that an instruction should be re-fetched. (4) shows the case in which a branch is not predicted, but is actually selected, and an instruction is to be re-fetched. (5) and (6) show the cases in which an EX instruction is used. In the case (5), processes are performed as in the case in which a branch is not predicted, but is actually selected. In the case (6), processes are performed as in the case a predicted branch is not selected.

When a branch is not predicted, but is actually selected, and an instruction is re-fetched, the value of the TIAR (when TIAR_MATCH=0, a correct value computed by the EAG 26) as a branched-to address after the branch is selected is an instruction re-fetch address. When a predicted branch is not selected and an instruction is re-fetched, the sum of the value of the instruction address register (IAR) 10 and the instruction word length ILC, that is, the address of the instruction after the branch instruction is an instruction re-fetch address.

Figure 10:
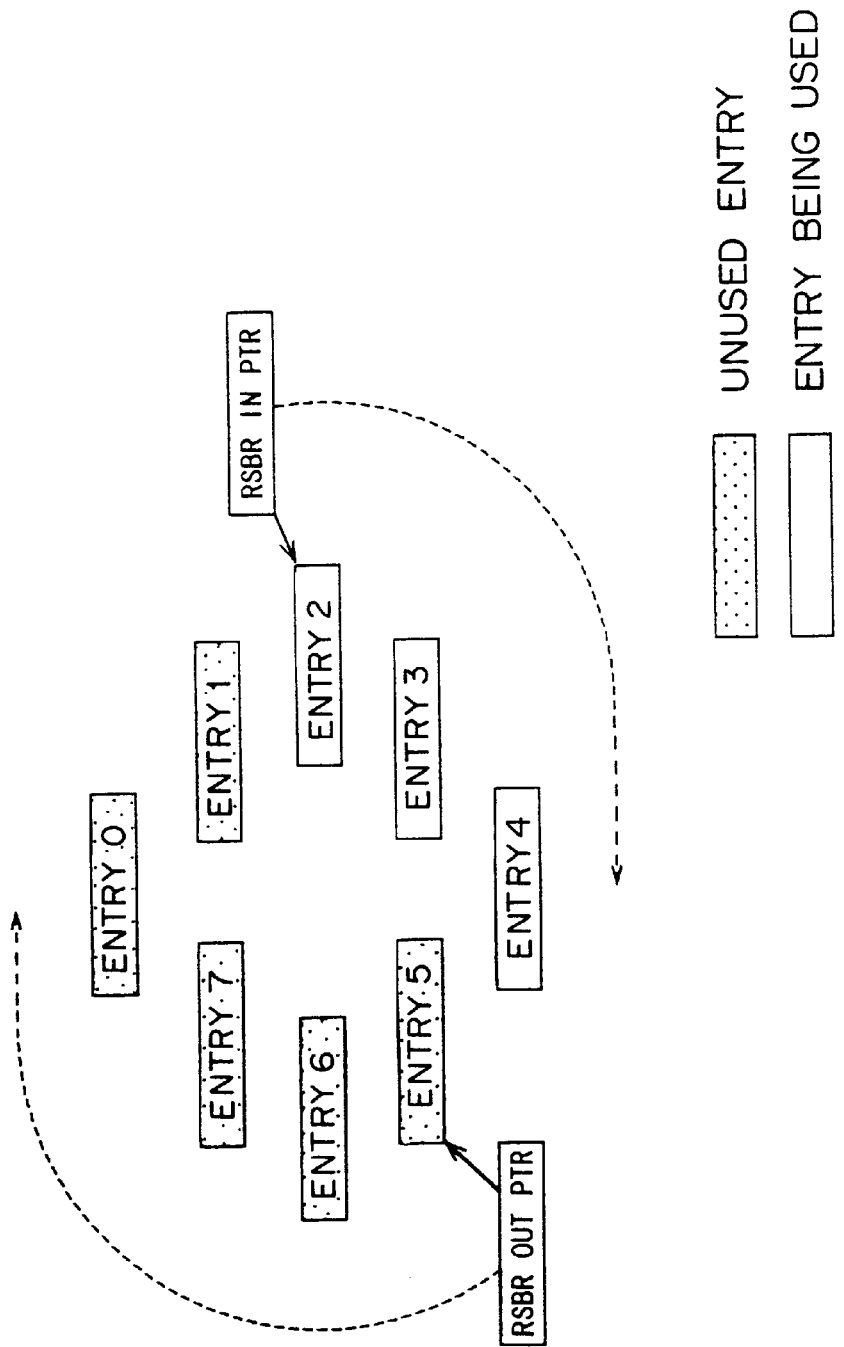
FIG. 10 shows the assignment and release of an entry in the RSBR.

FIG. 10 shows the assignment and the release of an entry in the RSBR. To execute a program in a correct order, for example, an instruction re-fetch request is to be issued in order. Therefore, the RSBR is a ring buffer as shown in FIG. 10. The RSBR includes an in-pointer and an out-pointer, and an entry is assigned in order of the original execution order, that is, the RSBR in-pointer, the RSBR in-pointer+1, the RSBR in-pointer+2, . . . Unless it is certain that an instruction is not re-fetched from the entry pointed to by the RSBR out-pointer, an instruction re-fetch request is not issued from the entry pointed to by the RSBR out-pointer+1, and unless it is certain that an instruction is not re-fetched from the entries pointed to by the RSBR out-pointer and the RSBR out-pointer+1, an instruction re-fetch request is not issued from the entry pointed to by the RSBR out-pointer+2.

When an instruction is to be re-fetched, there can be data stored in the RSBR entry corresponding to an instruction not to be executed. Such an entry should be released immediately after an instruction is re-fetched because the instruction execution unit and the instruction fetch unit are operated independent of each other. Unless the entry is immediately executed, an instruction can be fetched according to wrong information in the RSBR entry after an instruction is re-fetched until the completion report for the instruction is transmitted to the CSE 20. Therefore, if it is determined that an instruction is to be re-fetched, all entries after the entry are immediately released.

The instruction execution unit can also store an instruction not to be executed, and to be cleared. When a process of fetching a correct sequence of instructions is started in the instruction re-fetching process, the REIFCH_DONE bit in the entry designated for an instruction re-fetch is set to 1. The value of the bit is transmitted to the CSE 20 to generate a flash RS signal when a completion report to the CSE 20 is issued. When the value of the signal is 1, the instruction execution unit is cleared.

Figure 11:
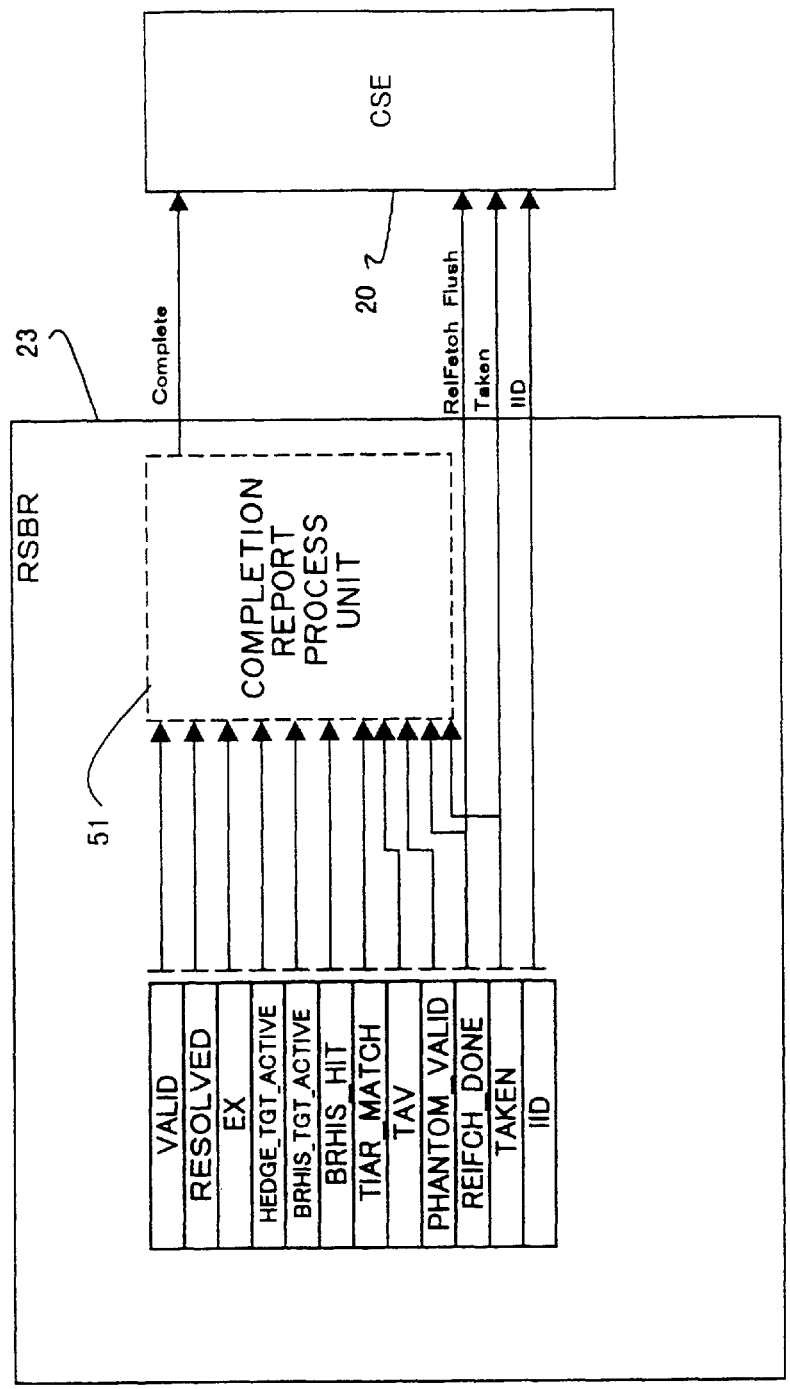
FIG. 11 shows the operation of a complete reporting unit in the RSBR.

Next, the operation of the completion report process unit for issuing a completion report to the CSE 20 when the process of a branch instruction corresponding to the entry of the RSBR 23 is completed is described below by referring to FIG. 11. In FIG. 11, a complete signal is output as a completion report from a completion report process unit 51 to the CSE 20. In addition, an instruction re-fetch flash signal, a taken signal, and a complete signal whose IID is provided for the CSE 20 indicate the completion of a branch process. The instruction re-fetch flash signal indicates that a clearing process by the instruction execution unit is required when the completion report is issued to the CSE 20. A taken signal is a taken bit itself of the entry of the RSBR, and indicates the result of determining whether a branch has been selected/not selected. The IID indicates for which instruction the completion report has been issued, and an IID is assigned corresponding one to one between the entries of the CSE 20 and the RSBR 23.

It is determined that the branch process is completed in the following cases (1) through (6), and the complete signal indicates an H level.

(1) A case in which a predicted branch is selected, and a correct target instruction is fetched to the instruction buffer 16.
(2) A case in which the prediction that a branch is not selected is correct.
(3) A case in which an instruction re-fetching process is completed.
(4) A case in which a phantom branch is determined.
(5) A case in which an EX instruction process is completed.
(6) A case in which a hedge fetch is performed, and the selection of a branch is determined.

An instruction re-fetch flash signal indicates the value of the REIFCH_DONE bit of the RSBR entry when the branch process is completed. When an instruction is re-fetched or when a branch is selected for a hedge fetched instruction, the instruction execution unit should be cleared, and the value of the bit is set to 1.

That is, when a branch is selected for a hedge-fetched instruction, a necessary sequence of instructions has already been stored in the instruction buffer 16, and it is not necessary to re-fetch an instruction. However, there is the possibility that an instruction not to be executed is stored in the instruction execution unit. Therefore, the instruction execution unit is to be cleared.

A completion report is issued in order to follow the original execution order of the program. Unless it is certain that an instruction pointed to by the RSBR out-pointer is, for example, not selected, a completion report for the entry pointed to by the RSBR out-pointer+1 is not issued, and unless it is certain that branch instructions pointed to by the RSBR out-pointer and the RSBR out-pointer+1 are not selected, a completion report for the entry pointed to by the RSBR out-pointer+2 is not issued.

Figure 12:
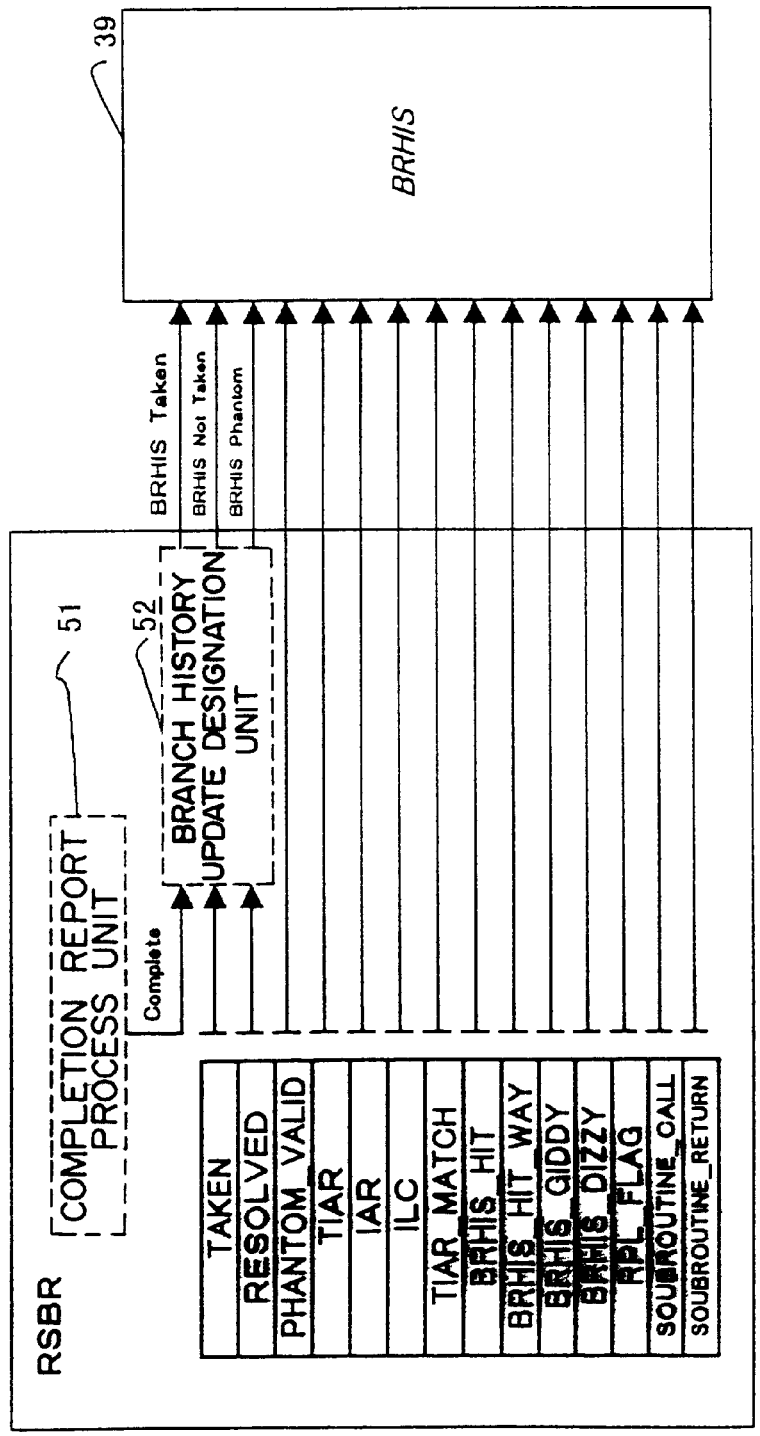
FIG. 12 shows the operation of a branch history update designation unit in the RSBR.

The update of the contents stored in a branch history is described below by referring to FIG. 12. As shown in FIG. 12, the RSBR 23 comprises a branch history update designation unit 52 for designating the BRHIS 39 to perform an updating process upon receipt of a complete signal from the completion report process unit 51 as described above by referring to FIG. 11. The branch history update designation unit 52 transmits three signals, that is, a BRHIS taken signal, a BRHIS not taken signal, and a BRHIS phantom signal, to the branch history. When all bit of these signals are zero (0), the branch history is not updated as described later. In addition to the three bits, various signals are transmitted from the entry of the RSBR 23 to the BRHIS 39, and the contents stored in the BRHIS 39 are updated according to these signals.

In view of the above described operations of the RSBR mainly by referring to the data flow, an example of the practical configuration of the RSBR is described below.

Figure 13:
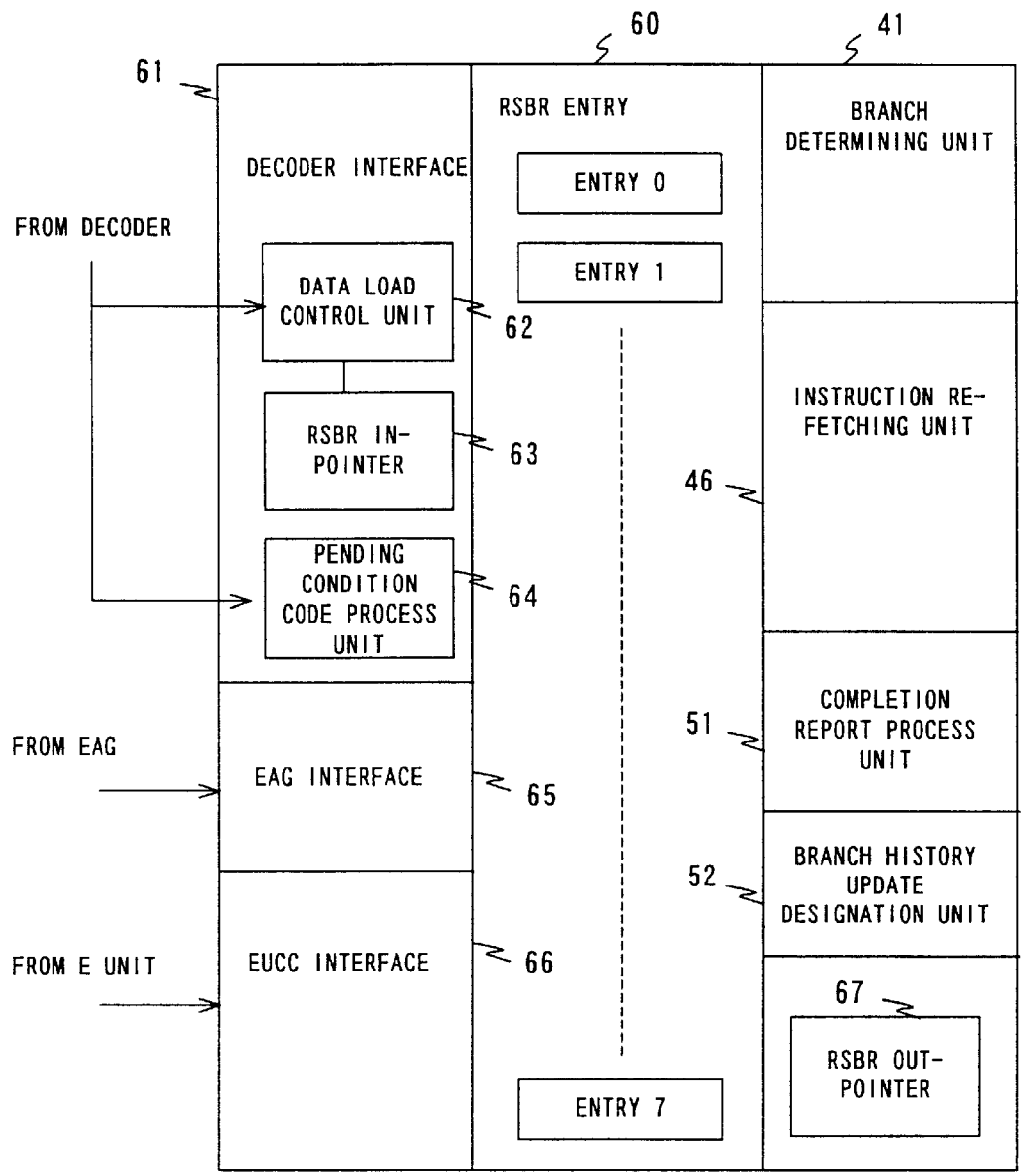
FIG. 13 is a block diagram of an example of the configuration of the RSBR.

FIG. 13 is a block diagram of a practical example of the configuration of the RSBR. In FIG. 13, entries 0 through 7 are provided as entries 60 storing the data of the RSBR. Furthermore, a decoder interface 61 comprises a data load control unit 62 for loading to an entry a branch instruction or the data for the process relating to a branch, an in-pointer 63 for use in specifying to which entry the data is to be loaded, and a pending condition code process unit 64 for performing a process relating to a pending condition code.

Furthermore, the RSBR comprises an EAG interface 65 for receiving a signal from the effective address generator EAG 26, an EUCC interface 66 for receiving from the operations unit the identifier of an instruction for which arithmetic operations have been completed, that is, the IID of a precedent instruction for changing a condition code, and an out-pointer 67 for designating for which entry a completion report is to be issued, and designating whether or not the entry is to be released.

The RSBR further comprises the branch determining unit 41 described by referring to FIG. 8, the instruction re-fetching unit 46 described by referring to FIG. 9, the completion report process unit 51 described by referring to FIG. 11, and the branch history update designation unit 52 described by referring to FIG. 12.

Figure 14:
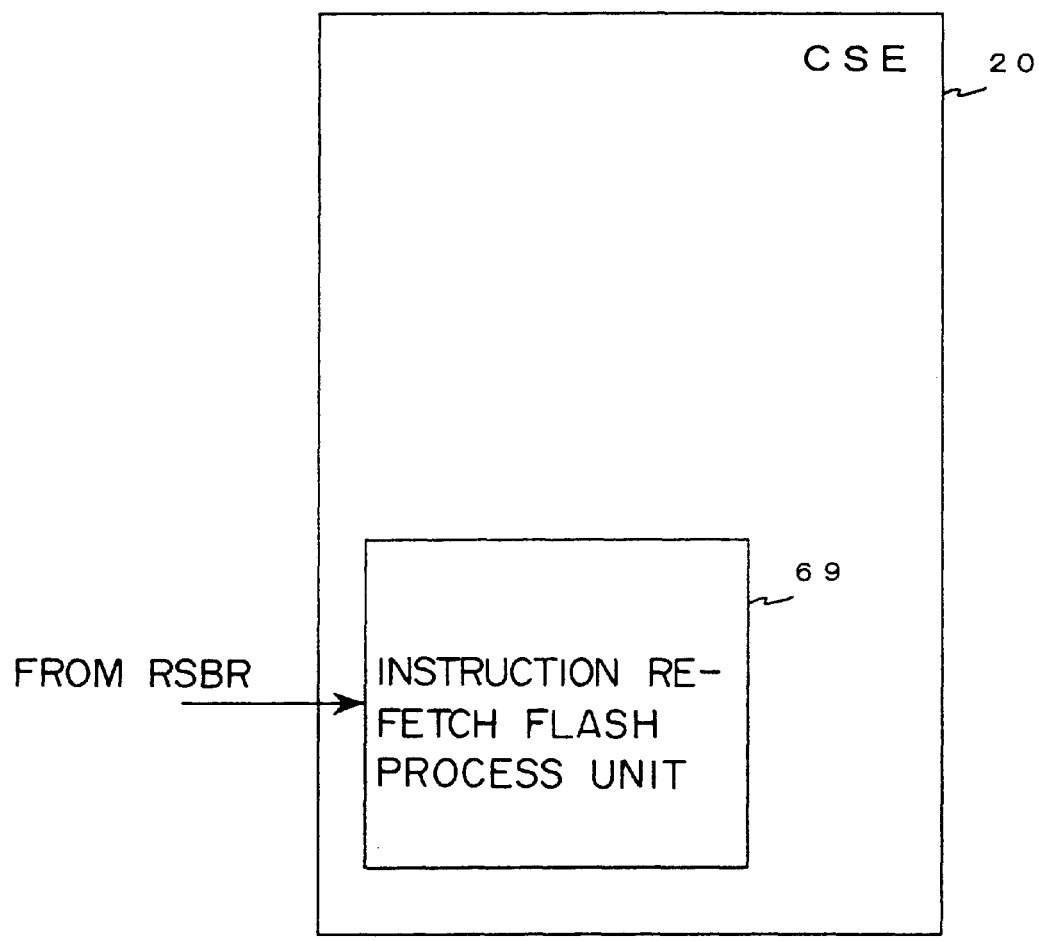
FIG. 14 is a block diagram of the configuration of the CSE showing the portion in the CSE directly related to the present invention.

FIG. 14 shows the inside of the commit stack entry CSE 20 shown in FIG. 2, and is a block diagram of the CSE showing the portion directly relating to the present invention. In FIG. 14, an instruction re-fetch flash process unit 69 is provided to clear the instruction execution unit when an instruction is detected as a hit in the BRHIS 39, but a branch is not selected, and an instruction is re-fetched. The operation is further described later.

Figure 15:
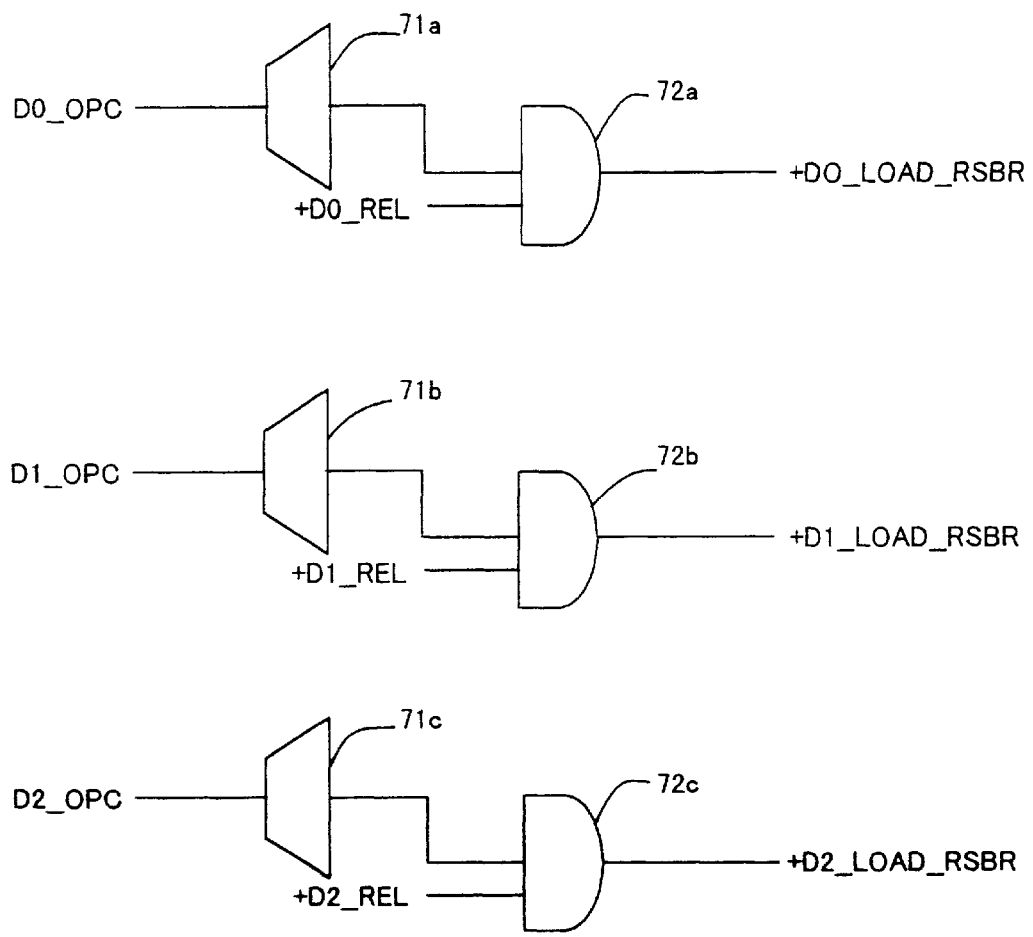
FIG. 15 shows an example of the configuration of a load data determination unit as a part of a data load control unit.
Figure 16:
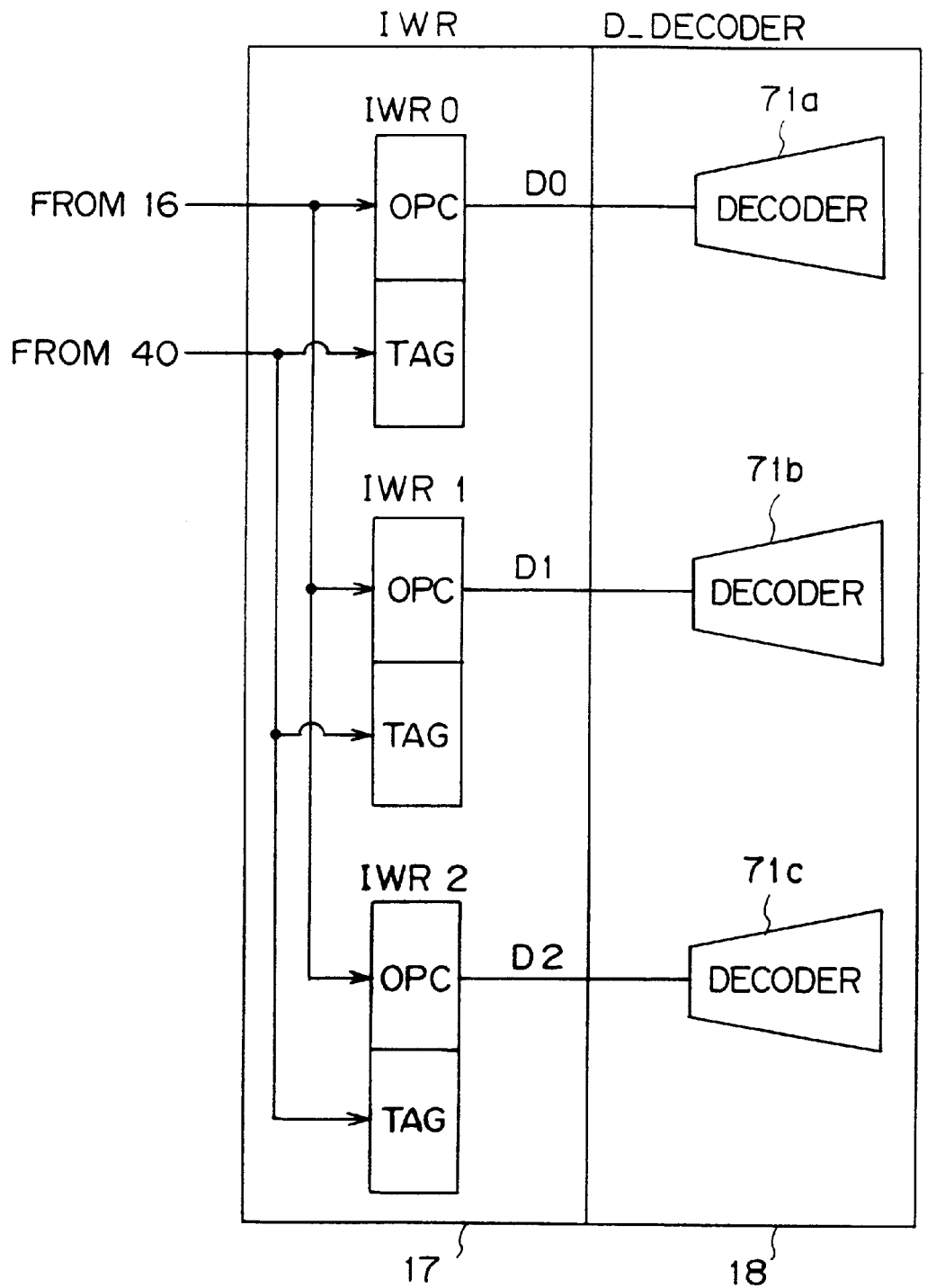
FIG. 16 shows an example of the configurations of an instruction word register and a decoder shown in FIG. 2.

FIG. 15 shows an example of the configuration of the load data determination unit as a part of the data load control unit 62. FIG. 16 shows an example of the configuration of the instruction word register (IWR) 17 and the decoder 18 shown in FIG. 2 in relation to FIG. 15. In the present embodiment, the instructions provided for the instruction buffer 16 are fetched in 3 units, and loaded to the three registers IWR 0, IWR 1, and IWR 2 forming the instruction word register 17. These three instructions are decoded by decoders 71a, 71b, and 71c forming the decoder 18.

Assume that the first instruction operation code is D0, the second instruction operation code is D1, and the last instruction operation code is D2. The operation code of each instruction is decoded. When it is discriminated that an instruction is a branch instruction, for example, the output from the decoder 71a indicates the H level, and provided for an AND gate 72a together with a release signal when the instruction for the D0 is completed, thereby outputting a D0_LOAD_RSBR signal indicating that the data relating to the branch is to be loaded from the D0 to the RSBR entry.

Figure 17:
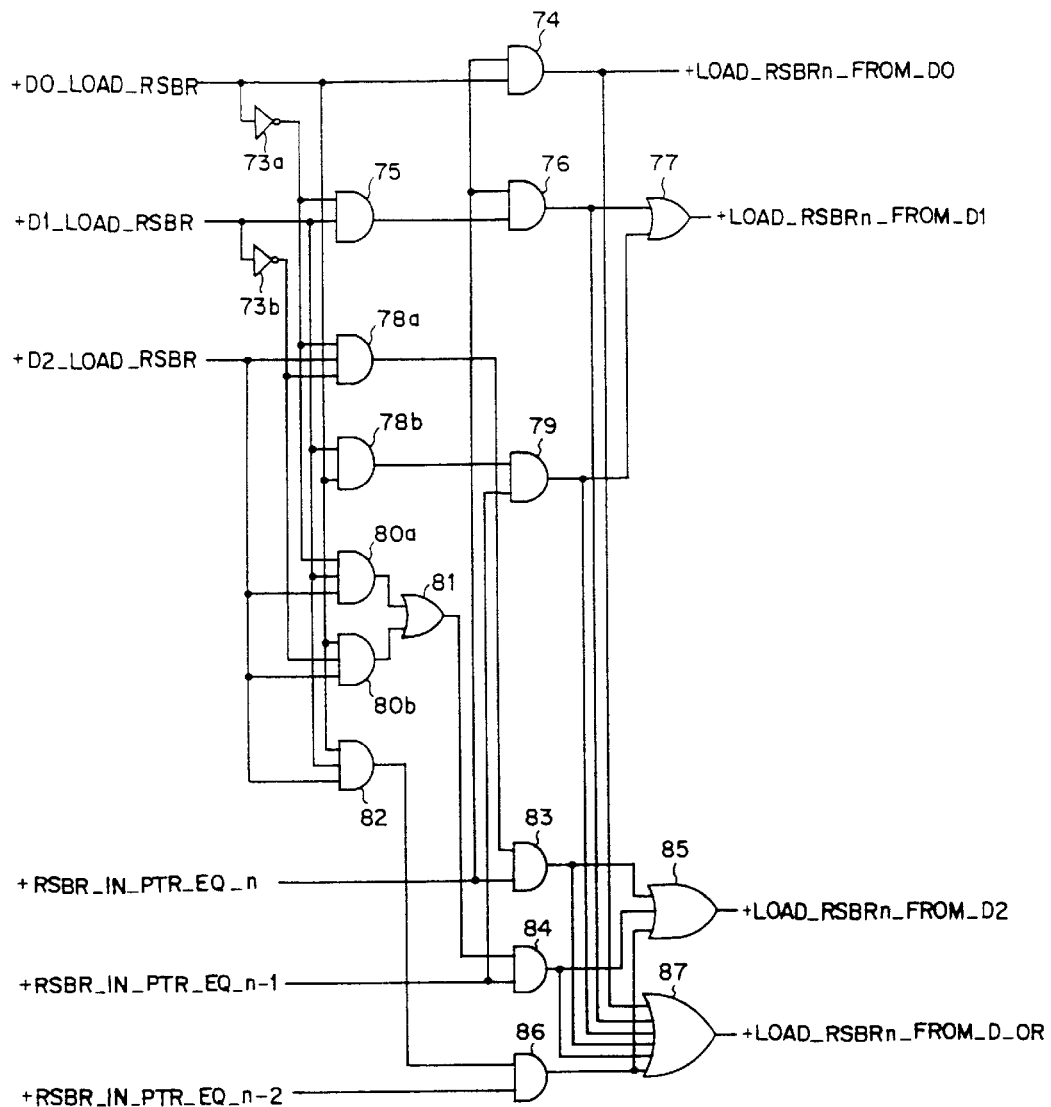
FIG. 17 shows an example of the configuration of a load data designation unit for each entry as a part of the data load control unit.

FIG. 17 shows an example of the configuration of the load data designation unit for each entry as a part of the data load control unit 62. The circuit shown in FIG. 17 specifies from which signal among the D0, D1, and D2 an instruction is selected to load data about a branch to the n-th entry of the RSBR.

In FIG. 17, when a D0_LOAD_RSBR signal indicating that an entry is to be generated for the D0 is input to an AND gate 74 from, for example, the load data determination unit shown in FIG. 15, the in-pointer EQ_n signal indicates the H level when the in-pointer of the RSBR points to the n-th entry at the moment, and the output from the AND gate 74 indicates the H level, thereby obtaining the LOAD_RSBRn_FROM_D0 signal indicating that the data from the D0 is to be loaded to the n-th entry also indicating the H level. Simultaneously, a signal for setting ON the valid bit of the entry, that is, the output from an OR gate 87 indicates the H level.

Next, if it is not necessary to generate an entry for the D0, and it is necessary to generate an entry for the D1, then the D1_LOAD_RSBR signal among the three input signals indicates the H level, the output from an AND gate 75 indicates the H level, and input to an AND gate 76. The in-pointer EQ_n signal is input to the AND gate 76 as it is input to the AND gate 74. If it indicates the H level, that is, if the in-pointer points to the n-th entry, then the outputs from the AND gate 76 and OR gates 77 and 78 indicate the H level, thereby outputting a signal from the OR gate 77 indicating the H level and that the data from the D1 is to be loaded to the n-th entry.

Similarly, if it is not necessary to generate an entry for the result of decoding the D0 and D1, but an entry is to be generated for the D2, then the outputs from AND gates 78a and 83, and OR gates 85 and 87 indicate the H level, and a signal indicating that data is to be loaded to the n-th entry from the decoding result D2 is output from the OR gate 85.

When it is necessary to generate an entry corresponding to the two instructions D0 and D1, the output from the AND gate 78b indicates the H level, and the output is input to an AND gate 79. An in-pointer EQ_n−1 signal is input to the other input terminal of the AND gate 79. This signal indicates the H level when the in-pointer points to the (n−1)th entry.

That is, the data from the D0 is stored in the (n−1)th entry, and the data from the D1 is stored in the n-th entry. FIG. 17 specifies the data stored in the n-th entry. When the in-pointer points to the (n−1)th entry, the n-th entry stores the data from the D1.

When the in-pointer points to the (n−1)th entry, the outputs from the AND gate 79, the OR gates 77 and 87 indicate the H level, and a signal indicating that the data from the D1 is to be stored in the n-th entry indicates the H level, and is output from the OR gate 77.

Simultaneously, when entries are to be generated for the D0 and D2, or for the data from the D1 and D2, that is, when two entries are generated, the output from an AND gate 80a or 80b indicates the H level, and the outputs from an OR gate 81, an AND gate 84, the OR gate 85, and an OR gate 87 indicate the H level, and a signal indicating that the data from the D2 is to be stored in the n-th entry indicates the H level and is output from the OR gate 85. At this time, the data from the D0 or the D1 is stored in the (n−1)th entry.

Finally, when entries are to be generated for all of the three instructions D0 through D2, the output from an AND gate 82 indicates the H level. The output is input to an AND gate 86. An in-pointer EQ_n−2 signal is input to the other input terminal of the AND gate 86, and indicates the H level when the in-pointer points to the (n−2)th entry. That is, in this example, the data from the D2 is stored in the n-th entry, the data from the D1 is stored in the (n−1)th entry, and the data from the D0 is stored in the (n−2)th entry. A signal indicating that the data from the D2 is to be stored in the n-th entry indicates the H level and is output from the circuit shown in FIG. 17 as an output from the OR gate 85.

Figure 18:
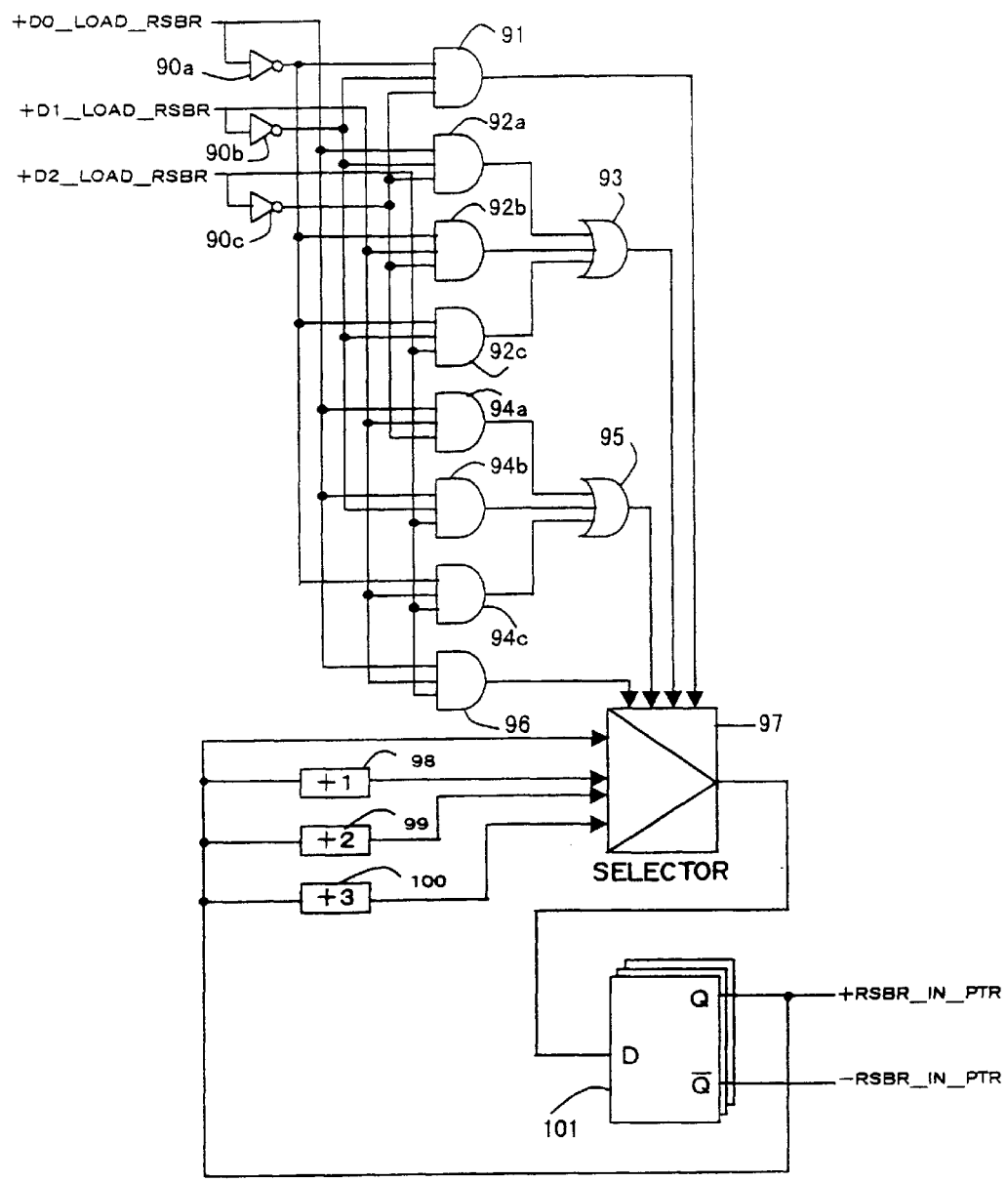
FIG. 18 shows an example of the configuration of an in-pointer of the RSBR.

FIG. 18 shows an example of the configuration of the in-pointer 63 of the RSBR. As described above, since three instructions are simultaneously decoded according to the present embodiment, the value of the in-pointer should be incremented by 2 when there are, for example two branch instructions included. The output from the pointer is an output from a 3-bit D-FE 101, and counts 000, 001, ..., 111, that is 0 through 7. Depending on how many branch instructions are contained in the three simultaneously decoded instructions, an output from the in-pointer can be obtained by inputting any of the outputs from incrementers 98, 99, and 100 of the outputs, that is, +1, +2, and +3, from the current counter 101 into a counter 101.

When three signals instructing the RSBR to generate an entry indicate the L level corresponding to the decoding results of the operation codes D0, D1, and D2 of the three instructions, all outputs from inverters 90a through 90c indicate the H level. According to the output from an AND gate 91, a selector 97 performs an operation such that the output from the counter 101 can be maintained as is (adding 0).

When one of the three entry generation designation signals indicates the H level, the output from the incrementer 98 is selected according to the selector 97, and the output from the counter 101 is incremented by 1.

When two of the entry generation designation signals indicate the H level, the output from the incrementer 99 is selected according to the output from an OR gate 95, and the output from the counter 101 is incremented by 2.

Furthermore, when all of the three generation designation signals indicate the H level, the output from the incrementer 100 is selected according to the output from an AND gate 96, and the output from the counter 101 is incremented by 3.

Figure 19:
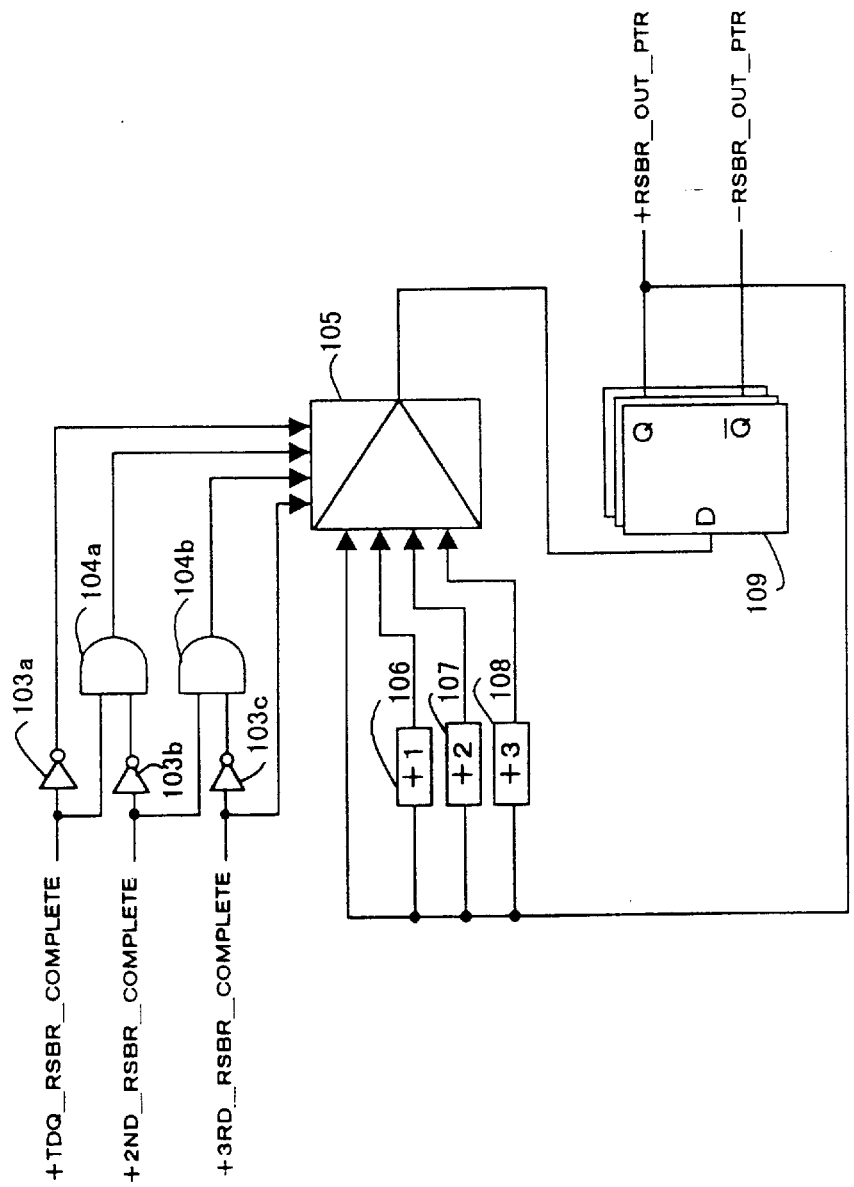
FIG. 19 shows an example of the configuration of an out-pointer of the RSBR.

FIG. 19 shows an example of the configuration of the out-pointer 67 of the RSBR. In FIG. 19, the selector 105, incrementers 106 through 108, and a counter 109 perform the operations similar to those of the in-pointer shown in FIG. 18.

However, as described by referring to FIG. 10, it is necessary that the entry of the RSBR is released in order. According to the present embodiment, it is checked whether or not the entry can be released simultaneously for the three entries when the in-pointer is updated as well as for the in-pointer. The number of entries simultaneously checked is regardless of '3' as the number of instructions to be simultaneously decoded, and can be set to an optional number.

In FIG. 19, the value pointed to by the current out-pointer is the top value, the next value is the second value, and the further next value is the third value. For example, if the value pointed to by the out-pointer is 5, then the top value is 5, the second value is 6, and the third value is 7.

As described above, a maximum of 3 entries of the RSBR are released simultaneously in order, the second entry can be released on condition that the top entries are simultaneously released, and the third entry can be released on condition that the top and second entries are simultaneously released.

That is, the entries of the RSBR can be released in the following four ways.

No entries are released.
Only the top entry is released.
Both top and second entries are released.
The three entries, that is, the top, the second, and the third entries, are released.

In any of the above described ways, the top entry in the execution order among the unreleased entries is the top entry on the next cycle.

Practically, the operations of an out-pointer are described below by referring to FIG. 19.

First, when the values of the complete signals for the three entries, that is, the values of the complete signals indicating that the entries are released after the processes for a branch have been completed, indicate the L level, only an output from an inverter 103a indicates the H level among the selection control signals to a selector 105, and the selector 105 outputs a signal indicating an addition of 0 to the counter 109, and the output from the counter 109 is maintained as is.

When only the complete signal for the top entry indicates the H level, the output from an AND gate 104a indicates the H level, the output from the incrementer 106 is selected, and the output from the counter 109 is incremented by 1.

Next, when the complete signals for the top and second entries indicate the H level, the output from the AND gate 104b indicates the H level, the output from the incrementer 107 is selected by the selector 105, and the output from the counter 109 is incremented by 2.

Furthermore, when the complete signals for the three entries, that is, the top, second, and third entries indicate the H level, the complete signal for the third entry is provided as is for the selector 105 as a selection control signal, the output from the incrementer 108 is selected, and the output from the counter 109 is incremented by 3.

Figure 20:
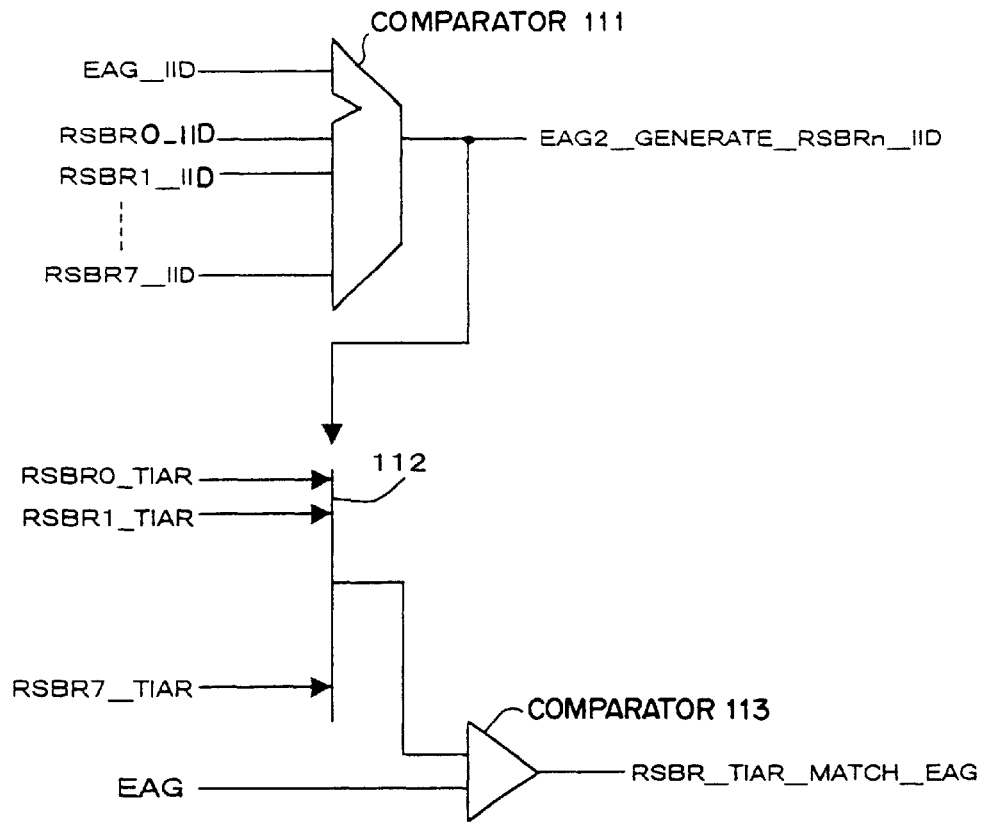
FIG. 20 shows an example of the configuration of an EAG interface.

FIG. 20 shows an example of the configuration of the EAG interface 65 shown in FIG. 13. In FIG. 20, a correct branched-to address for the branch instruction generated by the effective address generator (EAG) 26 shown in FIG. 2 is compared with the TIAR obtained from the branch history 39, that is, the target address.

First, a comparator 111 compares the identifier EAG_IID of the instruction corresponding to the address generated by the EAG 26 with the identifier IID of the instruction stored in each of the entries 0 through 7 of the RSBR, and it is determined by the comparison to which entry the generated target address corresponds.

According to the result, one of the TIARs stored in each entry is selected by a selector 112, and is compared with an address generated by the EAG 26. When it is determined that they match each other, the TIAR_MATCH bit in the entry is set to 1 by the output from a comparator 113. In addition, the value of the target address valid bit in the entry is set to 1 by the output from the comparator 111. In FIG. 20, the RSBRO_IID indicates the IID stored in the entry 0 of the RSBR 23.

Figure 21:
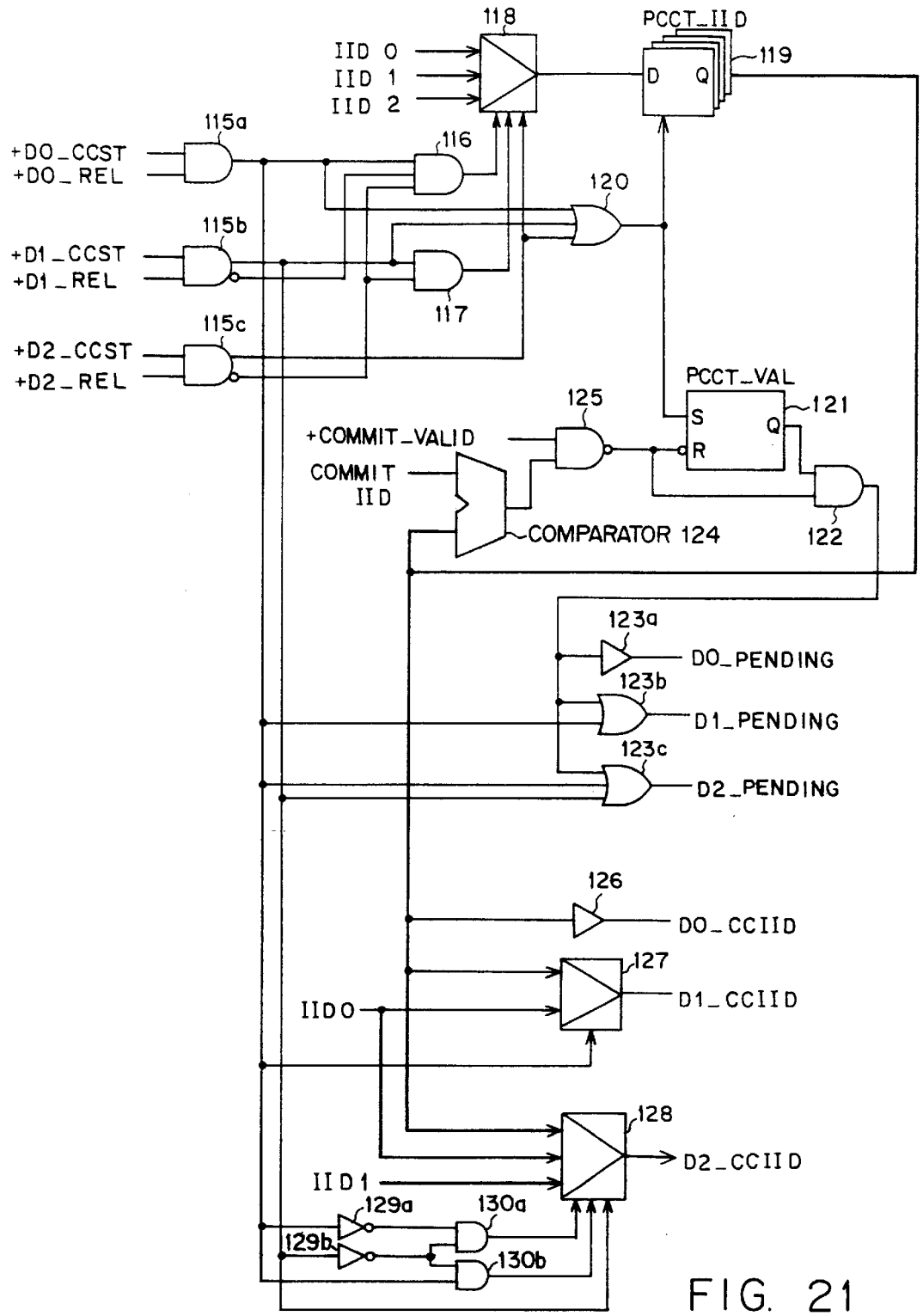
FIG. 21 shows an example of the configuration of a pending condition coding unit.

FIG. 21 shows an example of the configuration of the pending condition code process unit 64 shown in FIG. 13. FIG. 22 shows an example of a sequence of instructions for explanation of the operations of the pending condition code process unit. The processes performed by the pending condition code process unit 64 are described below by referring to the above described drawings.

As described above, it is assumed that three instructions are simultaneously decoded on one cycle. In FIG. 22, the first three instructions, that is, a load instruction, an addition instruction, and a store instruction are decoded respectively corresponding to the D0, D1, and D2. Among these three instructions, the addition instruction having the instruction identifier IID=1 determines the contents of the condition code corresponding to the subsequent branch instruction (BC instruction) having the IID=3. Until this instruction is completely executed, a branch of the subsequent BC instruction is not clear.

Assume that the cycle on which the three instructions are decoded is defined as a cycle i. By providing for an AND gate 115b a D1_CCST signal for setting the IID in a pending condition code table (PCCT)_IID 119 together with a release signal for the D1 corresponding to the result of decoding the addition instruction having the IID=1 for the D1, the output from the AND gate indicates the H level, and the output is input to an AND gate 117. The other input terminal of the AND gate 117, that is, the inverse output of the AND gate 115c also indicates the H level. In the inputs to a selector 118, the IID 1, that is, 1 as the IID for the addition instruction, is selected according to the output from the AND gate 117. The value is set in the PCCT_IID 119 formed by, for example, a four-bit FF (0000 through 1111, that is, 0 through 15). The clock signal for setting the value is provided by assigning the output from the AND gate 115b through an OR gate 120. In addition, the output from the OR gate 120 sets a set/reset FF forming a PCCT_VAL 121.

On the next cycle i+1, the branch instruction, the load instruction, and the subtraction instruction having the IID of 3 through 5 are decoded respectively corresponding to the D0, D1, and D2. On this cycle, the value of the PCCT_VAL has already indicated the H level, and the value of the PCCT_IID 119 is 1. On the other hand, the output from a NAND gate 125 indicates the H level, the output from an AND gate 122 indicates the H level, the D0 pending signal as the output from the OR gate 123a indicates the H level, and the value of the D0_IID as the output from a buffer 126 is 1.

For the entry generated in the RSBR corresponding to the branch instruction having the IID=3 corresponding to the D0, the value of the pending bit is 1, and the value of the CCIID is 1, and 1 is stored as a value of the CCIID. At this time, the signals of the D1 pending, and the D2 pending also indicate the H level as the outputs from OR gates 123b and 123c. However, since corresponding load instruction and subtract instruction are not branch instructions, these signals are insignificant, and are not referred to.

The subtraction instruction as the third instruction on the cycle i+1 also sets the condition code. Therefore, the D2_CCST signal indicates the H level, and is provided for the AND gate 115c together with the release signal, and the IID 2, that is, the IID=5 corresponding to the subtraction instruction, is stored in the PCCT_IID 119 by the selector 118. Then, the PCCT_VAL 121 is set again.

On the cycle i+2, the next three instructions, that is, the comparison instruction, the branch instruction, and the comparison instruction corresponding to the IID=6 through 8, are decoded corresponding to the D0, D1, and D2 respectively. The precedent instruction for changing the condition code of the branch instruction having the IID=7 corresponding to the D1 is a comparison instruction having the IID=6 corresponding to the D0, and the value of the CCIID for the branch instruction is 6.

Accordingly, the D0_CCST signal for setting a condition code corresponding to the D0 first indicates the H level, provided for the AND gate 115a together with the release signal, and the output indicates the H level. On the other hand, the inverse outputs from the AND gate 115b and 115c both indicate the H level, the output from an AND gate 116 indicates the H level, the selector 118 selects the IID 0, that is, the IID=6, and the value is overwritten to the PCCT_IID 119.

At this time, an entry is generated in the RSBR by a branch instruction corresponding to the D1. However, as a value of the pending bit stored in the entry, an 'H' as a value of the D1 pending signal which is an output from the OR gate 123b is output. As a value of the CCIID, the value of the IID 0, that is, the IID=6, is output as the D1-CCIID through a selector 127. The value of the pending bit of the entry of the RSBR is 1, and the value of the CCIID is 6.

The reset of the set/reset FF forming the PCCT_VAL 121 is described below by referring to FIG. 21. The FF 121 indicates that the IID stored in the PCCT_IID 119 is valid, that is, there is an instruction which changes a condition code, and whose execution has been started, but has not been completed. When an instruction which changes a condition code has been completed, there is not necessary to maintain the identifier of the instruction. Then, the FF 121 is reset when the precedent instruction is completed. The reset can be performed by inputting L to the inverse reset input terminal, but the reset signal is provided as an output from the NAND gate 125.

A commit valid signal indicating that the commit signal indicating the completion of the precedent instruction is valid, and an output from a comparator 124 are input to the NAND gate 125. The comparator 124 compares the identifier of an instruction whose execution has been completed, that is, the commit IID with the IID stored in the PCCT_IID 119. If these two instructions match, and the commit valid signal indicates the H level, the NAND gate 125 indicates the L level, and the FF 121 is reset.

Described below is the output of the CCIID to be stored in the entry when a branch instruction and a precedent instruction for changing the condition code of the branch instruction are contained in the three instructions to be decoded on the same cycle as shown in FIG. 21.

This indicates that, of the three instructions, the D1 or the D2 is a decoding result corresponding to the branch instruction, and the D0 or the D1 is a decoding result corresponding to the precedent instruction for changing the condition code. For example, if the D1 is a branch instruction, and the D0 is a result of the precedent instruction, then the entry generated corresponding to the D1 should store the IID 0. It is selected by the selector 127. The selector 127 selects the IID 0 on the cycle, and outputs it as the value of the D1_CCIID when the condition code set signal for the D0 and the release signal indicate the H level, and the output from the AND gate 115a indicates the H level.

When the decoding result D2 is a branch instruction, and the D0 or the D1 is the decoding result for the precedent instruction, a selector 128 selects the IID 0 or the IID 1, and outputs the result as a D2_CCIID. When the condition code set signal and the release signal indicate the H level, the AND gate 115b indicates the H level, thereby selecting the IID 1. On the other hand, when the condition code set signal for the decoding result D0, and the release signal indicate the H level, the output from the AND gate 115a indicates the H level. If the output from the AND gate 115b indicates the L level, then the output from the AND gate 130b indicates the H level, thereby selecting the IID 0.

Figure 23:
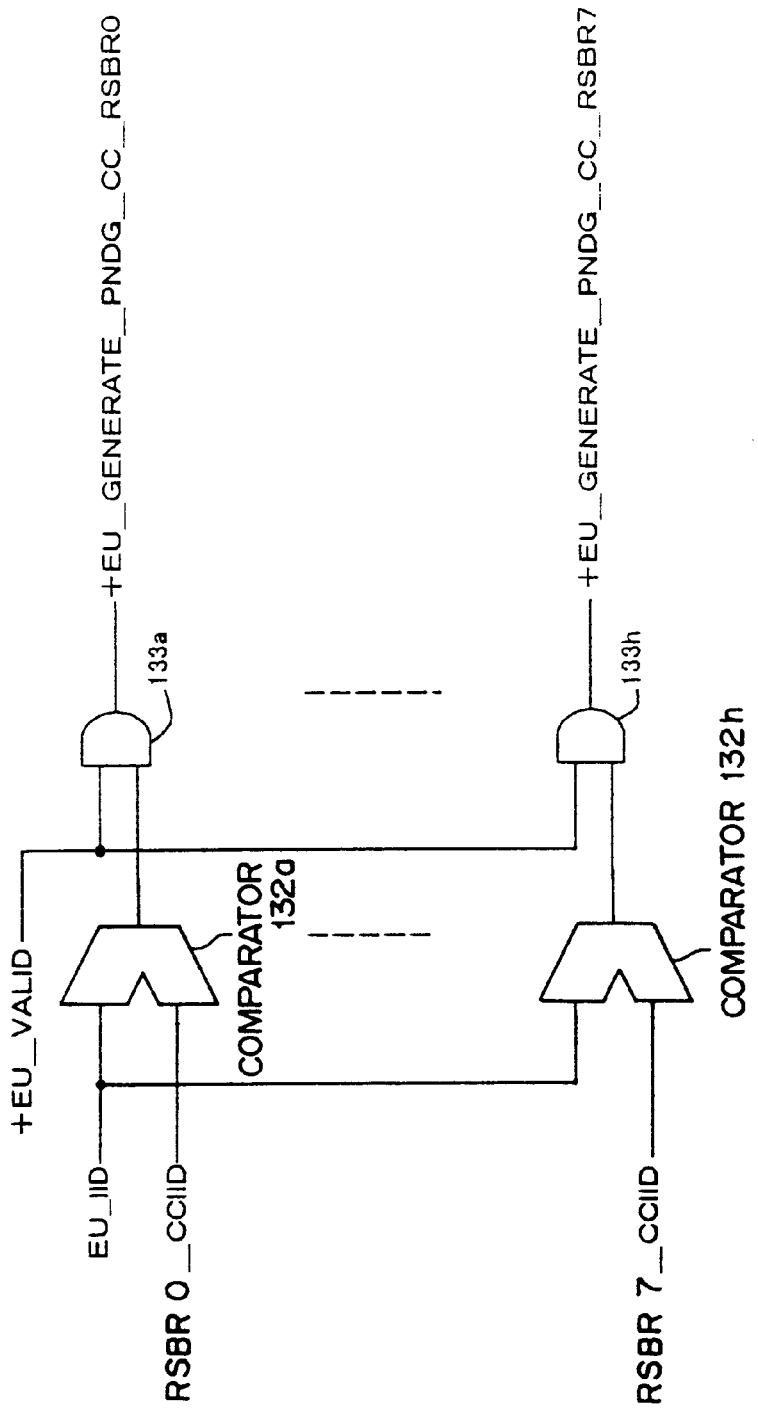
FIG. 23 shows an example of the configuration of the EUCC interface.

FIG. 23 shows an example of the configuration of the EUCC interface 66. In FIG. 23, the identifier of a precedent instruction for updating the condition code of the branch instruction stored in each entry of the RSBR, that is, the CCIID is compared by comparators 132a through 132h with the EU_IID indicating the identifier of the instruction whose arithmetic operations have been completed on the operations unit side. If the H level indicating a matching result is output as a comparison result is output from one of the comparators, then the output is input together with an EU_VALID signal indicating that the arithmetic operation results are valid to any of AND gates 133a through 133h. The output from the AND gate is provided for the branch determining unit 41 as an EU generate pending CC signal indicating that a condition code has been generated for the entry.

Figure 24:
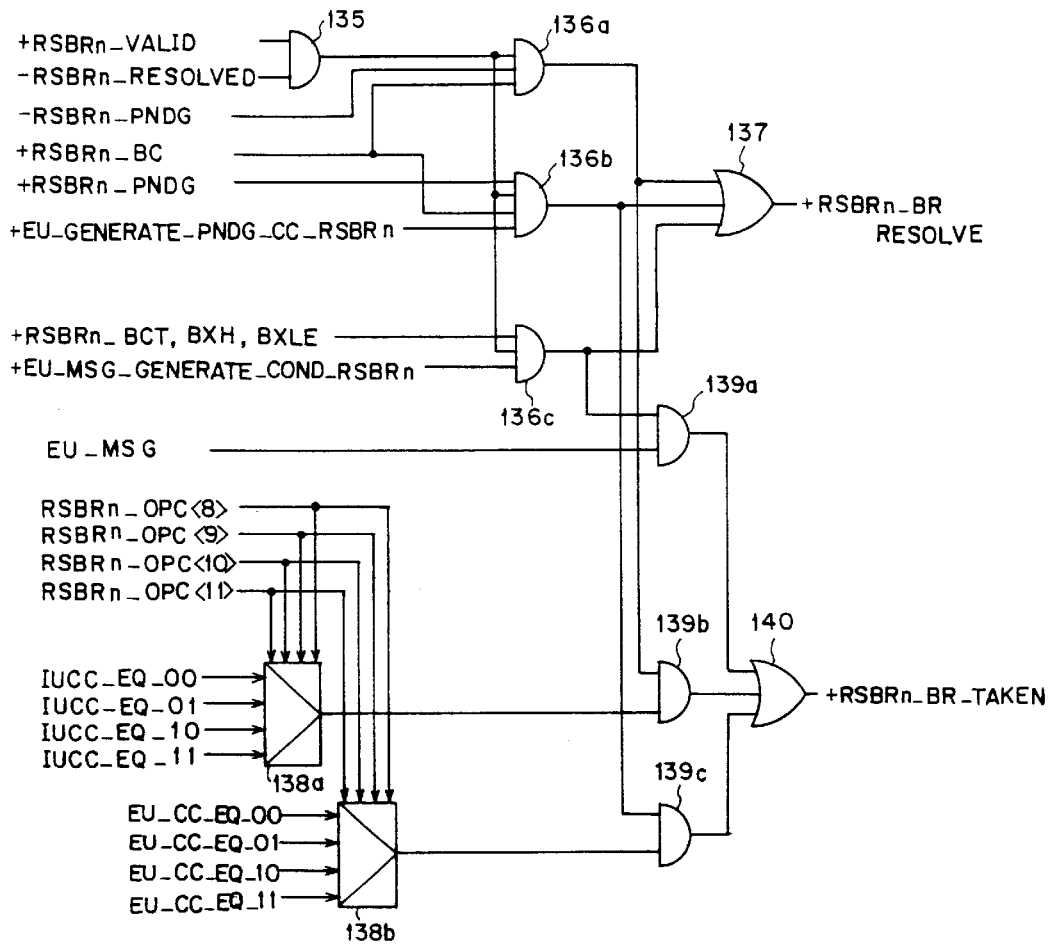
FIG. 24 shows an example of the configuration of the branch determining unit.

FIG. 24 shows an example of the configuration of the branch determining unit 41 shown in FIG. 13. In FIG. 24, a branch determination process and a branch selecting/not selecting discrimination process are performed.

A resolved signal indicating the determination of a branch is provided as an output from an OR gate 137. The output from the OR gate indicates the H level when any of the AND gates 136a, 136b, and 136c indicates the H level.

A branch is determined and selection/non-selection is discriminated for each entry. First, there are the following three necessary conditions to output the H level result. The first condition is that the output from an AND gate 135 indicates the H level, that is, the entry is valid and uncertain. The second condition is that a pending bit is off, that is, there is no condition code change instructions being executed when an instruction is decoded on the D cycle, and the condition code is determined. The third condition is that a branch instruction corresponding to the entry is a branch on condition instruction. When all these three conditions are satisfied, it is discriminated that the branch for the entry is determined.

Then, the conditions to output the H level result from the AND gate 136b are as follows. The first condition is that a pending bit is on, that is, there is a preceding condition code change instruction being executed when an instruction is decoded. The second condition is that the output from the AND gate 135 indicates the H level. The third condition is that the corresponding instruction is a branch on condition instruction. The fourth condition is that the condition code change instruction is executed, and the pending condition code is generated, that is, the generate pending CC signal for the corresponding entry shown in FIG. 23 indicates the H level. The output from the AND gate 136c indicates the H level when a message that the condition of selection/non-selection of a branch has been generated is received from an operations unit corresponding to the BCT, BXH, or BXLE instruction. That is, the input is the output from the AND gate 135, the value of a field indicating the BCT the BXH, or the BXLE instruction of the entry of the RSBR, and an EU message generate condition signal indicating that the condition for determination of a branch has arrived from the operations unit as a message. When all these signals indicate the H level, the output from the AND gate 136c indicates the H level.

Next, the selection/non-selection of a branch is notified as an output from an OR gate 140. When the branch is selected, the output indicates the H level.

The output from the OR gate 140 indicates the H level when the output from any of three AND gates 139a through 139c indicates the H level.

The output from the AND gate 139a indicates the H level when the output from the AND gate 136c and the EU_MSG signal both indicate the H level, and a taken signal indicating the selection of the branch is output from the OR gate 140. The EU_MSG signal is the actual data of the message transmitted from the operations unit corresponding to the above described BCT, BXH, or the BXLE instruction. For example, when the data is 1, a taken signal indicating that the branch is selected is output from the OR gate 140.

The output from the AND gate 139b indicates the H level when the condition code is determined on the decoding cycle as described above, and the condition code set in the IUCC matches the value of the mask field. The selector 138a compares the 8th bits through the 11th bits of the operation code, that is, each bit of the mask field, with each bit of the condition code IUCC transmitted from the instruction control unit. When corresponding bits match each other, the output from the selector 138a indicates the H level. When the output from the AND gate 136a indicates the H level informing that the branch for the branch on condition instruction has been determined, the output from the AND gate 139b indicates the H level.

The output from the AND gate 139c indicates the H level when an operation of the precedent instruction which changes the condition code is executed to generate a condition code, and the value of the mask field matches the condition code generated by the operations unit. That is, the selector 138b compares the four bits of the mask field with the value of the condition code as a result of the completion of the operation transmitted from the operations unit, the H level output is provided when the corresponding bits match each other, and the output from the AND gate 136b, that is, the condition code, is generated and provided for the AND gate 139c together with the output indicating that the branch is determined. Thus, the output indicates the H level.

Figure 25:
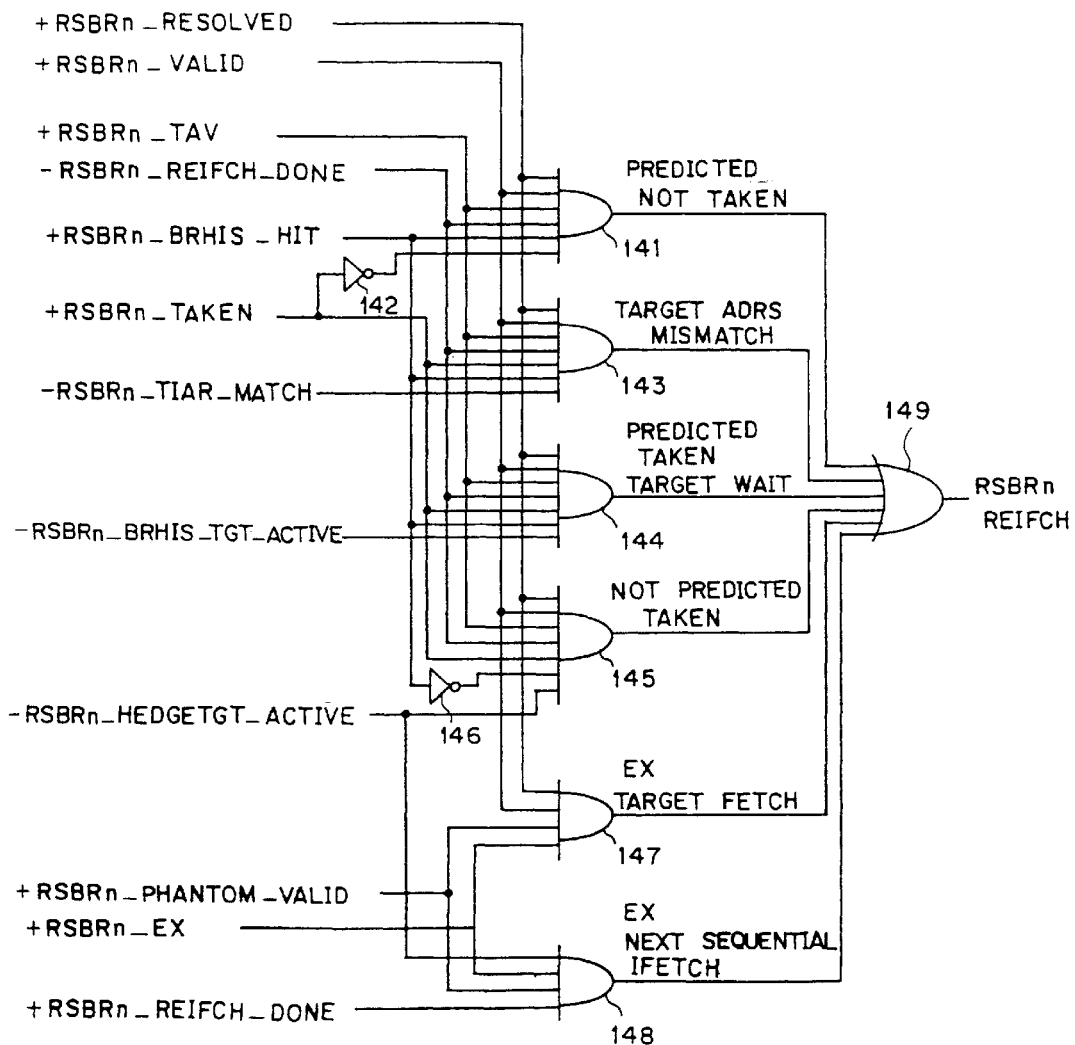
FIG. 25 shows an example of the configuration of an instruction re-fetch condition generation unit as a part of the instruction re-fetching unit.

FIG. 25 shows an example of the configuration of the instruction re-fetch condition generation unit as a part of the instruction re-fetching unit 46 shown in FIG. 13. In FIG. 25, a signal indicating an instruction re-fetch is given as an output from the OR gate 149. The output indicates the H level when the output from any of six AND gates 141, 143, 144, 145, 147, and 148.

First, the output from the AND gate 141 indicates the H level when a branch is predicted, but is not actually selected. The condition is that the branch for the entry is determined, the entry is valid, the target address is valid, an instruction is not re-fetched, there is a bit in a branch history, and the entry is not taken, that is, not selected. When the output from an inverter 142 indicates the H level, the entry is not selected.

The output from the AND gate 143 indicates the H level when a branch is predicted, and the branch has been selected, but the target address is different from the correct value computed by the EAG 26, that is, the target address mismatches the correct value. The input to the AND gate 143 is different from the input to the AND gate 141 in that the entry is taken, and the TIAR_MATCH bit indicates the L level, that is, a signal indicating mismatch is added.

The output from the AND gate 144 indicates the H level when it is predicted that a branch is selected, the branch is actually selected, but a branched-to sequence of instructions is not fetched to the instruction buffer 16, that is, the branch history target active indicates the L level. When compared with the input to the AND gate 143, the branch history target active signal indicating the L level is input as replacing the TIAR_MATCH signal (L) indicating a target address mismatch.

The output from the AND gate 145 indicates the H level when it is not predicted that a branch is selected, that is, although it is predicted that a branch is not selected, the branch is actually selected. For example, when compared with an input to the AND gate 141, a taken signal indicating the selection of a branch is input without an inverter, a signal indicating a hit in a branch history is inverted by an inverter 146, and a hedge target active signal is input as the L level indicating that an instruction is not hedge fetched.

The output from the AND gate 147 indicates the H level when a target instruction is fetched corresponding to the EX instruction. When the branch is determined, the entry is valid, and the phantom valid signal and the EX signal both indicate the H level, the output of the AND gate 147 indicates the H level.

The output from the AND gate 148 indicates the H level when an instruction is fetched corresponding to the EX instruction to return from the target instruction to the instruction after the position of the original instruction. The output from the AND gate 148 indicates the H level when the outputs from the input phantom valid, EX, and instruction re-fetch done signals all indicate the H level, and the hedge target active signal indicates the L level, the output from the AND gate 148 indicates the H level.

Figure 26:
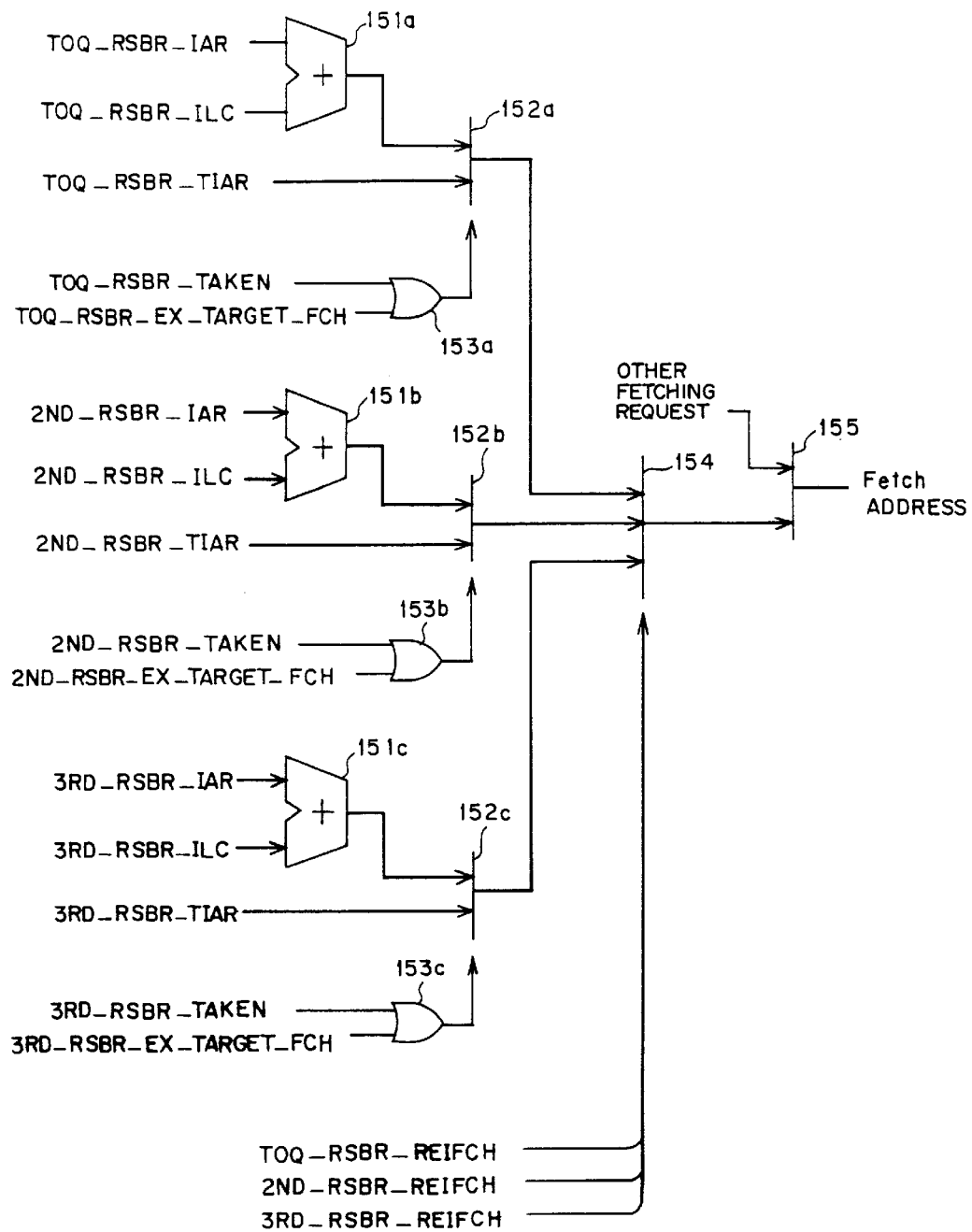
FIG. 26 shows an example of the configuration of a fetch address selection unit as a part of the instruction re-fetching unit.

FIG. 26 shows an example of the configuration of the fetch address selection unit as a part of the instruction re-fetching unit 46. In FIG. 26, the instruction re-fetch address is provided as the output from a selector 155, but the selector 155 selects the fetch address corresponding to another fetch request and an instruction re-fetch address according to the present invention. The instruction re-fetch address is provided as an output from a selector 154. The selector 154 selects a fetch address corresponding to the three entries, that is, the top, second, and third entries. An instruction fetch address corresponding to the three entries is selected regardless of simultaneously decoding three instructions, and checking the update of an in-pointer and an out-pointer in three entry units, that is, the number can be optionally set.

The instruction re-fetch address for the top entry of given as an output from a selector 152a. The selector 152a selects either the outputs from an adder 151a or a target address stored in the entry, that is, the TIAR. The adder 151a adds the IAR shown in FIG. 3, that is, the branch instruction stored in the entry of the RSBR, its own instruction address, and the length ILC of the instruction word of the branch instruction. The sum provides an address of the instruction after the branch instruction when the branch is not selected.

The selector 152a selects the TIAR when the output from an OR gate 153 indicates the H level, and selects the output from the adder 151a when the output indicates the L level. When a taken signal indicating that a branch has been selected, or a signal indicating that a target instruction is to be fetched corresponding to the EX instruction is input, the output from the OR gate 153a indicates the H level.

The instruction re-fetch address corresponding to the second entry is provided as an output from the selector 152b, and the address corresponding to the third entry is provided as the output from the selector 152c. The operation is the same as that corresponding to the top entry.

Figure 27:
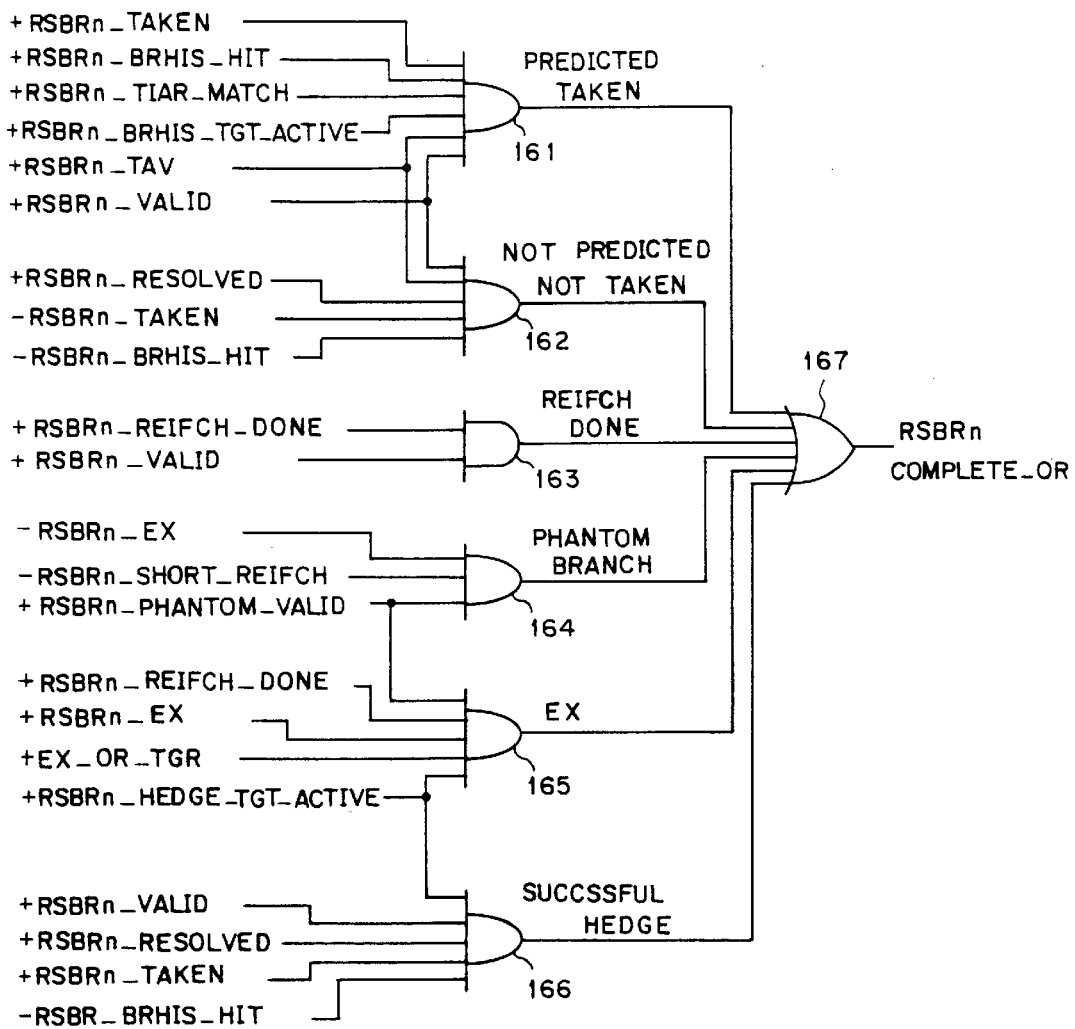
FIG. 27 shows an example of the configuration of a branch process completion condition detection unit as a part of the complete reporting unit.

FIG. 27 shows the branch process completion condition detection unit corresponding to the entry of the RSBR as a part of the completion report process unit 51. In FIG. 27, it is indicated that the branch process for the n-th entry is completed when the output from an OR gate 167 indicates the H level.

When any output from six AND gates 161 through 166 indicates the H level, the output from the OR gate 167 indicates the H level. When a branch is predicted and is then selected, the output from the AND gate 161 indicates the H level. The input to the AND gate 161 can be a taken signal, branch history hit signal, a TIAR_MATCH signal for a target address, a branch history target active signal, a target address valid signal, and a valid signal for the entry. When all of these six signals indicate the H level, the output from the AND gate 161 indicates the H level.

The output from the AND gate 162 indicates the H level when a branch is not predicted nor selected. The condition is that, among the five inputs, a target address valid signal, a valid signal for an entry, and a resolved signal indicating a branch determination indicate the H level, and a taken signal, a branch history hit signal both indicate the L level.

The output from the AND gate 163 indicates the H level when an instruction is re-fetched. The condition is that the instruction re-fetch done signal and a valid signal for an entry both indicate the H level.

The output from the AND gate 164 indicates the H level when a phantom branch is determined. The condition is that the phantom valid signal indicates the H level, and the EX signal and the short instruction re-fetch signal (a short instruction re-fetch refers to re-fetching an instruction independent of a branch using the address stored in an entry, and, when the short instruction re-fetch signal indicating the state in which the fetching process is performed indicates the H level, the output from the AND gate 164 indicates the L level) both indicate the L level. In this example, the condition of the L level of the EX signal is obtained by the H level of the phantom valid signal for the EX instruction, and is satisfied to avoid the confusion with the case of the EX instruction.

The output from the AND gate 165 indicates the H level for the EX instruction. The condition is that all of the instruction re-fetch done signal, the EX signal, the hedge target active signal, and the EX_OR_TGR signal (when the EX instruction is executed, a modifying process is performed on the operand of the target instruction. This signal is modified, and indicates the H level when the EX instruction is executed) indicate the H level. The hedge target active signal is commonly used also for the EX instruction.

The output from the AND gate 166 indicates the H level when a hedge fetching process is successfully performed. The condition is that all of the four signals, that is, the hedge target active signal, the valid signal, the resolved signal, and the taken signal, indicate the H level, and the branch history hit signal indicates the L level.

Figure 28:
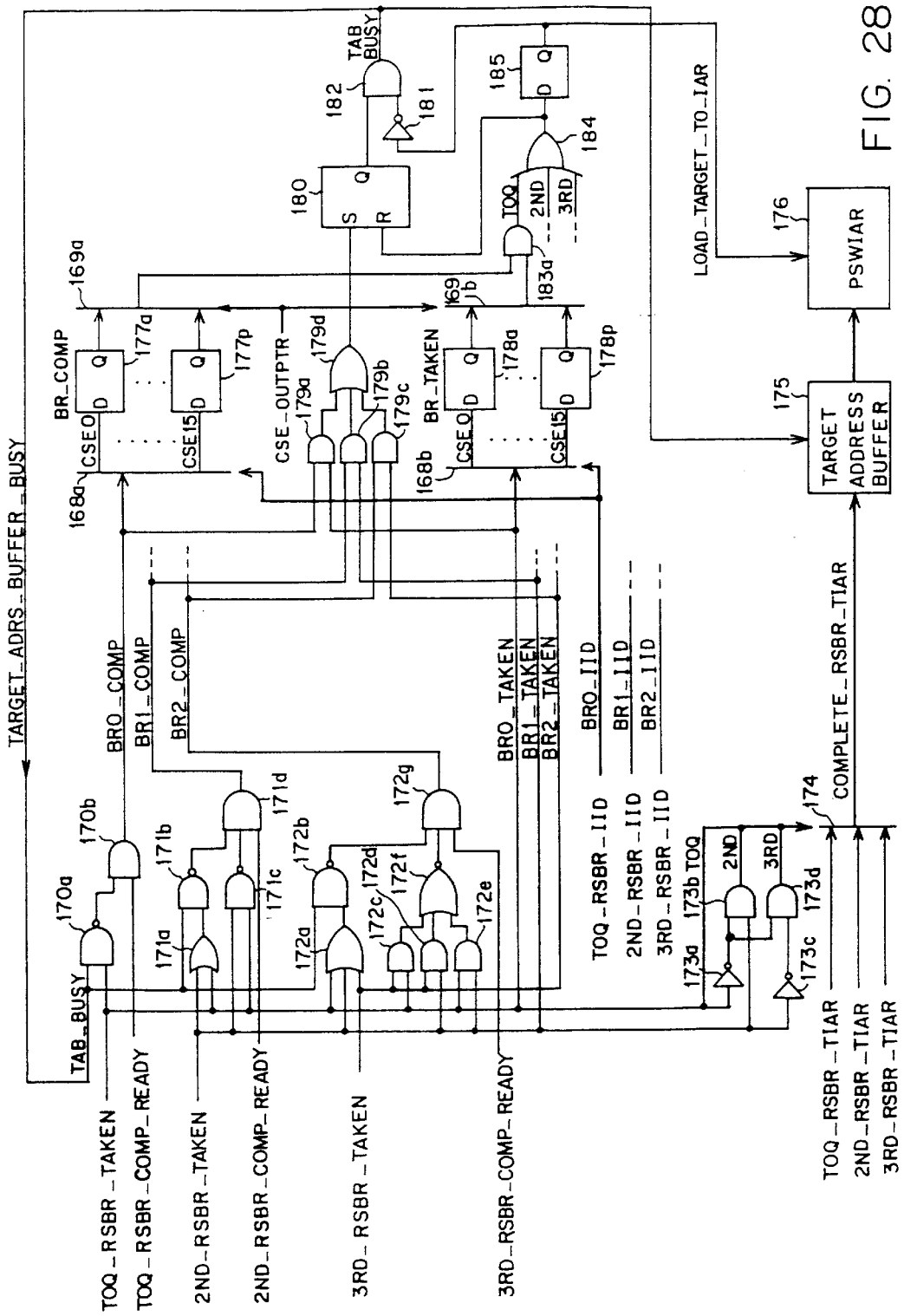
FIG. 28 shows an example of the configuration of a PSEIAR updating unit as a part of the complete reporting unit.

FIG. 28 shows an example of the configuration of the instruction address register updating unit for a program status word as a part of the completion report process unit 51 shown in FIG. 13. FIG. 28 contains a part of the commit stack entry (CSE) 20. The circuit shown in FIG. 28 is operated by the input of the taken signal, the complete ready signal, and the target address TIAR corresponding to the three entries basically from the top through the third. The complete ready signal corresponds to the complete OR signal output from the OR gate 167, can be obtained from the complete OR signals through the circuit shown in FIG. 29, that is, the conversion circuit from the complete OR signal to the complete ready signal, and is used as an input to FIG. 28.

Figure 29:
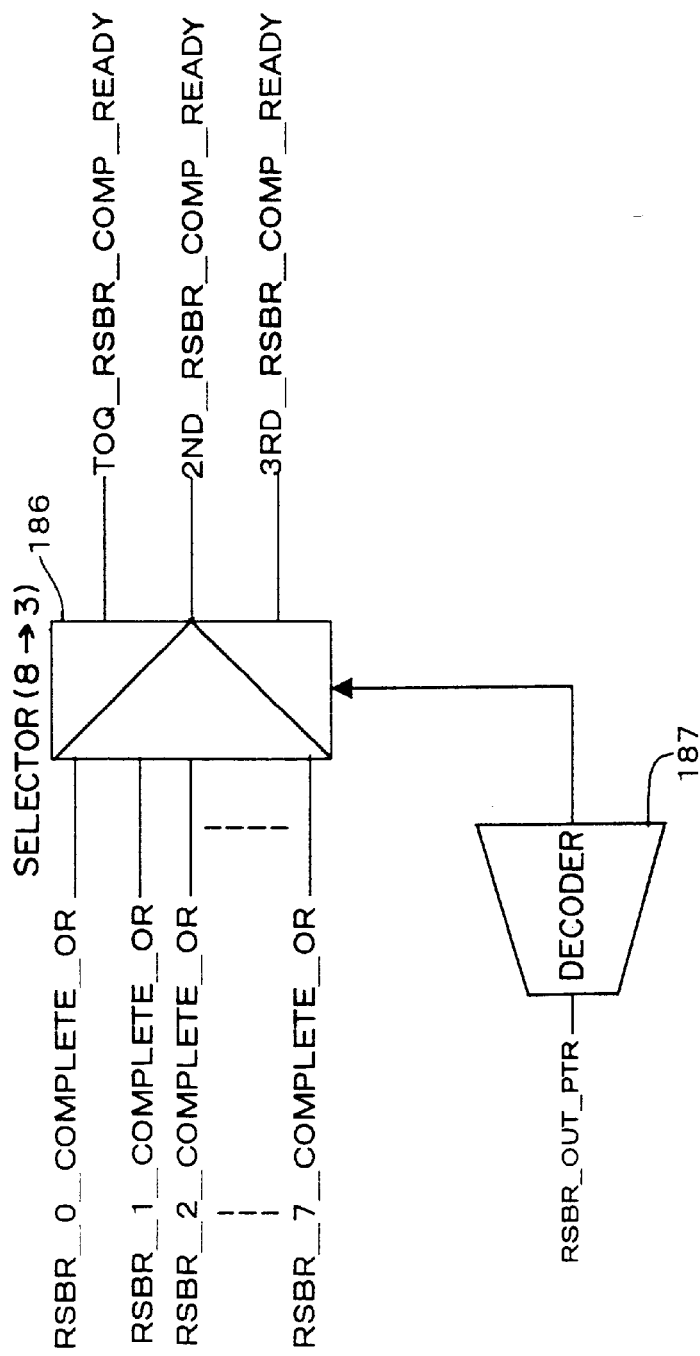
FIG. 29 shows an example of a conversion circuit from a complete OR signal to a complete ready signal.

In FIG. 29, among the complete OR signals corresponding to eight entries, the complete ready signals corresponding to the three entries from the top to the third are selected by a selector 186. The selection is controlled by the output from a decoder 187 by providing the output of the out-pointer for the decoder 187.

In FIG. 28, for example, if the taken signal for the top entry indicates the H level, then the selector 174 selects the target address TIAR for the top entry although the complete ready signal for the same entry indicates the L level, and the target address is stored in a target address buffer 175.

If the taken signal for the top entry indicates the L level, and the taken signal for the second entry indicates the H level, then a selector 174 selects the TIAR for the second entry by the operation of an inverter 173a and an AND gate 173b, and the target address is stored in the target address buffer 175. Similarly, when the taken signal for the third entry indicates the H level, then the TIAR for the third entry is stored in the target address buffer 175 through the selector 174 by the operation of an inverter 173c and an AND gate 173d.

If the taken signal for the top entry indicates the H level, and the target address buffer (TAB) busy signal described later indicates the L level, then the output from a NAND gate 170a indicates the H level, and when the complete ready signal for the top entry indicates the H level, the output from an AND gate 170b indicates the H level. It is provided for the commit stack entry (CSE) 20 for a complete signal for the entry 0.

The complete signal is stored in a flipflop storing the complete state in the CSE 20 depending on the value of the instruction identifier IID for the top entry, for example, the FF corresponding to the identifier in sixteen flipflops, for example, an FF 177a, and the output indicates the H level. However, at this point, the CSE out-pointer points to, for example, the position for another entry, and the output from the FF 177a has not yet been provided for the AND gate 183a.

On the other hand, the taken signal and the complete signal for the top entry are provided for the AND gate 179a. When the output indicates the H level, a set/reset FF 180 is set through an OR gate 179d, and the output Q indicates the H level. As described above, for example, the output from a AND gate 183a still indicates the L level, and a D-FF 185 is not set through an OR gate 184. Therefore, the output from an inverter 181 indicates the H level, and the output from an AND gate 182, that is, the TAB busy signal, indicates the H level.

The TAB busy signal is a control signal for use in protecting the target address buffer 175 from being loaded with the next target address. When the signal is provided for the target address buffer 175, the next target address is protected from being stored in the target address buffer 175.

For example, when the taken signal for the top entry indicates the H level, the selection state of a branch is stored in an FF, for example, the FF 178, specified by the identifier IID for the top entry among the flipflops 178a through 178p corresponding to 16 entries indicating the selection of a branch in the CSE 20, and the output Q indicates the H level.

When the CSE out-pointer points to the position, '0' in this example, of the FF in the CSE for the top entry, the outputs from the two flipflops 177a and 178a are provided for the AND gate 183a, and the output from the OR gate 184 indicates the H level, thereby resetting the set/reset FF 180 with the output from the D-FF 185 indicating the H level.

This output is provided for a PSWIAR 176 as a load control signal for use in loading an instruction address register (PSWIAR) 176 of a program status word with a target address stored in the target address buffer 175, and the target address stored in the target address buffer 175 is stored in the PSWIAR 176.

The output from the D-FF 185 is inverted by the inverter 181, and provided as an L level output for the AND gate 182. Thus, the TAB busy signal indicates the L level. As a result, the next target address can be stored in the target address buffer 175.

The output logic of the BR1 complete signal and the BR2 complete signal respectively for the second entry and the third entry is described below by referring to FIG. 28. The gate group from an OR gate 171a to an AND gate 171d outputs a BR1 complete signal, and an OR gate 172a through an AND gate 172g output a BR2 complete signal.

In FIG. 28, a complete signal corresponding to a maximum of three entries can be output for the top through the third entries. However, for two or more entries for which a branch is 'taken', complete signals cannot be simultaneously output.

When a branch is 'taken' for two entries, there are two target addresses. These target addresses are stored in the target address buffer 175, and is then to be stored in the PSWIAR 176. However, the target address buffer 175 can store only one target address on one cycle. Accordingly, when a branch is selected for two or more entries, the system should be controlled such that a complete signal is output to only one entry, and is output again to another entry on the next cycle.

If, for example, a branch for the top entry is 'taken' among the top through the third entries, and although a branch for the second or the third entry is 'taken', the output of the complete signal for the entry is delayed to the next cycle. That is, in the order from the top through the third entries, if a branch for a higher order entry is 'taken', and although a branch for a lower order entry is 'taken', the output of a complete signal for the entry is controlled to appear on the next cycle. The above described gate group is used for the control.

Normally, since the CSE 20 completely performs the process, the target addresses TIAR stored in the RSBR are sequentially set in the target address buffer 175 when taken signals are received. The set target addresses are stored in the PSWIAR 176 one cycle later.

Figure 30:
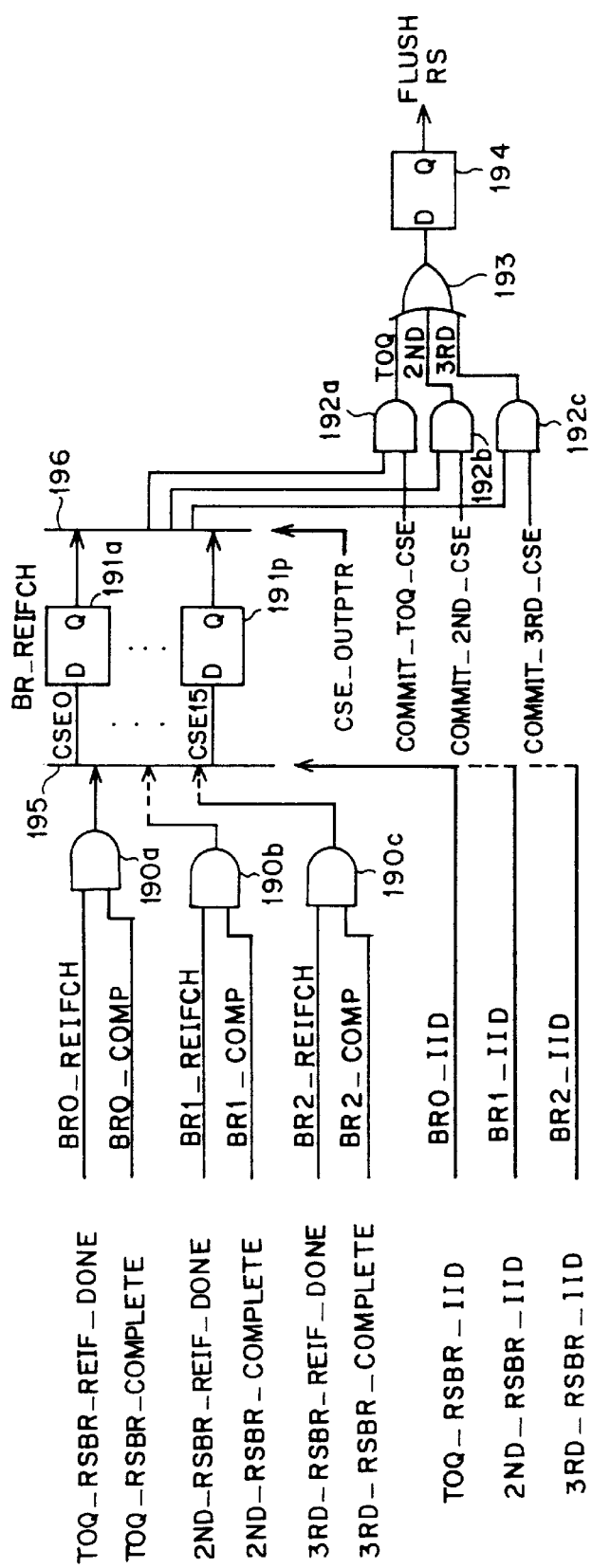
FIG. 30 shows an example of the configuration of an instruction re-fetch flashing unit.

FIG. 30 shows an example of the configuration of the instruction re-fetch flash process unit 69 in the CSE 20 described by referring to FIG. 14. The instruction re-fetch flash process unit 69 outputs a flash RS signal when, for example, an instruction is re-fetched as described above, and the instruction execution unit, etc. is to be cleared.

A D-FF 194 for outputting a flash RS signal as shown in FIG. 30 flashes and nullifies all operations performed by the decoder for three instructions described above, that is, D0, D1, and D2 on one cycle, and the operand access unit, the operation execution unit in each of the reservation stations, that is, the CSE 20, the RSA 21, the RSE 22, the RSBR 23, and the storage control unit (S unit), that is, E units by resetting, for example, a valid bit. Thus, all operations being performed after the branch instruction causing the flash RS signal to set a flash RS signal are canceled.

In FIG. 30, the output from the D-FF 194 for outputting a flash RS signal indicates the H level only when the output from an OR gate 193, that is, the output from any of the three AND gates 192a through 192c indicates the H level. The flash RS signal is output when the commit signal transmitted after selecting the top, second, and third entries whose processes have been completed in the CSE 20 in order from the first in the execution order indicates the H level, and the output from the D-FF specified by the CSE out-pointer in D-FFs 191a through 191p indicating that an instruction is re-fetched in the CSE 20 indicates the H level. For example, when the output from the D-FF 191a indicates the H level, and the commit signal for the top entry indicates the H level, the output from the AND gate 192a indicates the H level, and a flash RS signal caused by the branch instruction for the top entry is output.

Any of the outputs from three AND gates 190a through 190c corresponding to the top, second and third entries for the instruction identifier IID corresponding to each entry is provided for the D-FF indicating that an instruction is re-fetched through a selector 195. For example, an instruction re-fetch done signal for the top entry and a complete signal are provided for the AND gate 190a, and the D-FF, for example, 191a specified by the IID corresponding to the top entry stores that an instruction has been re-fetched.

Figure 31:
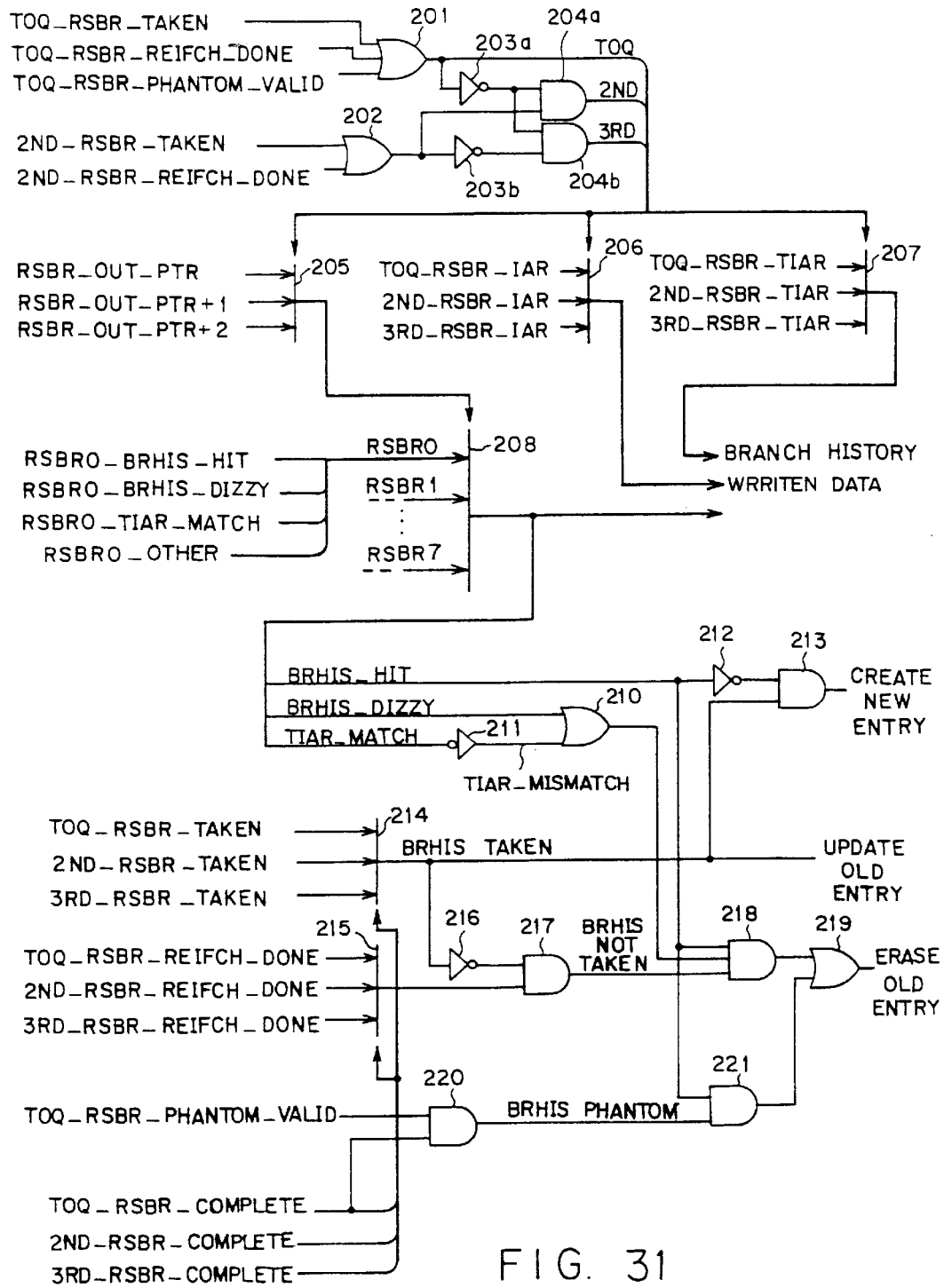
FIG. 31 shows an example of the configuration of an update designation unit for a branch history.

FIG. 31 shows an example of the configuration of the branch prediction mechanism, that is, the branch history update designation unit 52 shown in FIG. 13 for a branch history. In FIG. 31, the upper half shows the data written to the branch history, and the lower half shows an instruction for the branch history. FIG. 31 shows a part of the branch history 39.

First, an update instruction for a branch history is described below. The instruction can be an update old entry as an instruction to update an old entry, an erase old entry as an instruction to erase an old entry, and a create new entry as an instruction to generate a new entry. First, an update old entry signal indicates the H level when a taken signal for each entry selected by the selector 214 is input according to the complete signal for any of the top, second and third entries. An instruction to update an old entry is issued.

The instruction to create a new entry is output as the output from an AND gate 213 when the branch history hit signal indicates the L level, the output from an inverter 212 indicates the H level, and any of the taken signals corresponding to the three entries selected by a selector 214 indicates the H level.

An erase old entry signal as an instruction to erase an old entry is output when the output from an OR gate 219, that is, the output from an AND gate 218 or 221 indicates the H level. The AND gate 221 indicates the H level when the BRHIS phantom signal output from an AND gate 220 indicates the H level, and the signal of the branch history hit signal indicates the H level. The output from the AND gate 220 is output when the phantom valid signal for the top entry and the complete signal both indicate the H level. For the AND gate 220, a phantom valid signal corresponding to the top entry is input. According to the embodiment of the present invention, assuming that only one process is performed on a phantom, and only a phantom valid signal corresponding to the top entry is used as a control signal, phantom valid signals corresponding to the second and subsequent entries are not used as control signals.

The output from the AND gate 218 indicates the H level when the branch history hit signal indicates the H level, and the outputs from an OR gate 210 and an AND gate 217 both indicate the H level. The output from the OR gate 210 indicates the H level when the branch history dizzy signal indicates the H level, or the match signal for a target address indicates the L level, and the output from an RSA 211 indicates the H level, that is, a target address mismatches.

The output from the AND gate 217 indicates the H level when the output from an inverter 216, and the inverted signal of the BRHIS taken signal indicate the H level, and an instruction re-fetch done signal corresponding to any of the three entries indicates the H level. The output from the AND gate 217 is a BRHIS not taken signal. When the BRHIS taken signal, the BRHIS not taken signal, and the BRHIS phantom signal are all zero (0), an instruction to update a branch history is not issued.

The data written to the branch history can be a value of the instruction address register, a value of the target address register, a branch history hit signal, a branch history dizzy signal, and other signals. A value of an out-pointer can be selected by a selector 205, a value of an instruction address register is selected by a selector 206, a value of a target address is selected by a selector 207, other data is selected by a selector 208, and provided as the data written to the branch history.

The control of the above listed selectors is described below. The output from an OR gate 201 indicates the H level and the value for the top entry is selected when any of the taken signal, the instruction re-fetch done signal, and the phantom valid signal for the top entry indicates the H level. The output from an OR gate 202 indicates the H level and the value corresponding to the second entry is selected by the output from an AND gate 204a when all of the taken signal, the instruction re-fetch done signal, and the phantom valid signal for the top entry indicates the L level, and either the taken signal or the instruction re-fetch done signal corresponding to the second entry indicates the H level. When the outputs from the two OR gates 201 and 202 indicate the L level, the value corresponding to the third entry is selected by the output from the AND gate 204b.

The embodiment of the present invention has been described above in detail. However, the configuration of the RSBR described by referring to FIG. 13, the data stored in each entry, the practical configuration of each block in the RSBR, etc. are not limited to the above described applications, but can be realized in various embodiments within the scope of the claims according to the present invention.

As described above in detail, a process on a branch instruction and an instruction having an influence on the branch instruction can be realized using a branch reservation station comprising a plurality of entries storing data corresponding to each branch instruction, thereby speeding up the process performed on a sequence of instructions containing a branch instruction, and improving the performance of an information processing device.

What is claimed is:

1. A branch instruction execution control apparatus which controls execution of a branch instruction in an information processing device executing sequentially given instructions, comprising:

an instruction determination unit determining whether an instruction is a branch instruction, and whether a process relating to a branch is required as a result of decoding the instruction; and a branch reservation station unit generating an entry storing the branch instruction or data needed to perform the process relating to the branch when it is determined that the instruction is a branch instruction or that the process relating to the branch is required as a result of the determination, where the process needed to execute the branch instruction can be performed in accordance with data stored in each entry and independently of instruction order, and when instruction processing is completed in said branch reservation station unit, one entry or a plurality of entries are simultaneously released in an execution order of branch instructions.

2. The apparatus according to claim 1, further comprising:

a precedent instruction identifier storage unit storing an identifier of a precedent instruction preceding an instruction to be decoded and having an influence on whether a branch is selected/not selected for the instruction to be decoded;

an identifier valid flag storage unit storing a flag indicating that the precedent instruction has not been completely executed, and the identifier stored in said precedent instruction identifier storage unit is valid; and a control unit having said identifier valid flag storage unit store the flag when the execution of the precedent instruction is started, having said precedent instruction identifier storage unit store the identifier of the precedent instruction, comparing an instruction identifier contained in a completion report of the precedent instruction with the identifier stored in said precedent instruction identifier storage unit when the precedent instruction is completely executed, recognizing completion of the precedent instruction, and resetting the flag stored in said identifier valid flag storage unit.

3. The apparatus according to claim 1, wherein:

said branch reservation station unit comprises a storage area storing a flag indicating whether a branch is determined/not determined and a flag indicating whether a branch is selected/not selected; and when it is certain that the branch is selected/not selected when the instruction is decoded, the generated entry stores values of a flag indicating a determination of a branch and a flag indicating whether the branch is selected/not selected, and, when it is not certain that the branch is selected/not selected when the instruction is decoded, the generated entry stores a value of a flag indicating that the branch is uncertain.

4. The apparatus according to claim 3, further comprising:

a precedent instruction identifier storage unit storing an identifier of a precedent instruction preceding an instruction to be decoded and having an influence on whether a branch is selected/not selected for the instruction to be decoded;

an identifier valid flag storage unit storing a flag indicating that the precedent instruction has not been completely executed, and the identifier stored in said precedent instruction identifier storage unit is valid; and a control unit having said identifier valid flag storage unit store the flag when the execution of the precedent instruction is started, having said precedent instruction identifier storage unit store the identifier of the precedent instruction, comparing an instruction identifier contained in a completion report of the precedent instruction with the identifier stored in said precedent instruction identifier storage unit when the precedent instruction is completely executed, recognizing completion of the precedent instruction, and resetting the flag stored in said identifier valid flag storage unit.

5. The apparatus according to claim 3, wherein when it is not certain whether a branch is selected/not selected when the instruction is decoded, a flag indicating whether the branch is selected/not selected is stored corresponding to the determination result when it can be determined whether the branch is selected/not selected regardless of an execution order of instructions.

6. The apparatus according to claim 3, wherein when a precedent instruction preceding the instruction to be decoded and having an influence on whether a branch is selected/not selected for the instruction to be decoded has not been completely executed, the generated entry stores data indicating that the precedent instruction has not been completely executed, and data identifying the precedent instruction.

7. The apparatus according to claim 6, further comprising:

a precedent instruction identifier storage unit storing an identifier as data for identifying the precedent instruction;

an identifier valid flag storage unit storing a flag indicating that the precedent instruction has not been completely executed, and the identifier stored in said precedent instruction identifier storage unit is valid; and a control unit having said identifier valid flag storage unit store the flag when the execution of the precedent instruction is started, having said precedent instruction identifier storage unit store the identifier of the precedent instruction, comparing an instruction identifier contained in a completion report of the precedent instruction with the identifier stored in said precedent instruction identifier storage unit when the precedent instruction is completely executed, recognizing completion of the precedent instruction, and resetting the flag stored in said identifier valid flag storage unit.

8. The apparatus according to claim 6, wherein when it can be determined upon completion of execution of the precedent instruction whether the branch is selected/not selected regardless of an execution order of instructions, a flag indicating whether the branch is selected/not selected is stored corresponding to the determination result.

9. The apparatus according to claim 8, wherein said branch reservation station unit detects the completion of the execution of the precedent instruction using the data stored in said unit and identifying the precedent instruction.

10. The apparatus according to claim 3, further comprising:

a branch selection/non-selection prediction unit predicting whether a branch is selected/not selected when a branch instruction is decoded, and providing said branch reservation station unit with a prediction result as a value, to be stored in the entry, of a flag indicating whether a branch is selected/not selected;

an instruction speculative execution unit speculatively executing instructions subsequent to the branch instruction according to the prediction result from said branch selection/non-selection prediction unit; and an instruction re-execution unit nullifying an instruction execution result obtained by said instruction speculative execution unit when there arises inconsistency between a value of a flag, stored in said branch reservation station unit, indicating whether a branch is selected/not selected, and an actual determination result as to whether a branch is selected/not selected, and executing an instruction corresponding to the actual determination result.

11. The apparatus according to claim 3, further comprising:

a branch selection/non-selection prediction unit predicting whether a branch is selected/not selected when a branch instruction is decoded, and providing said branch reservation station unit with a prediction result as a value, to be stored in the entry, of a flag indicating whether a branch is selected/not selected, and having an entry generated in said branch reservation station unit store a predicted value of a branched-to address when selection of a branch is predicted;

an instruction speculative execution unit speculatively executing instructions subsequent to the branch instruction according to the prediction result from said branch selection/non-selection prediction unit; and an instruction re-execution unit nullifying an instruction execution result obtained by said instruction speculative execution unit when a predicted value of a branched-to address stored in said branch reservation station unit does not match an actually obtained branched-to address, and executing instructions subsequent to the actually obtained branched-to address.

12. The apparatus according to claim 1, further comprising:

an instruction speculative execution unit speculatively executing a non-branch subsequent instruction subsequent to a decoded instruction when it is not certain whether a branch is selected/not selected as a result of decoding an instruction; and a branched-to instruction execution unit nullifying an instruction execution result obtained by said instruction speculative execution unit when it becomes certain that a branch is selected after an entry storing data corresponding to the decoded instruction is generated in said branch reservation station unit, and executing instructions subsequent to a branched-to instruction of the branch instruction.

13. The apparatus according to claim 1, wherein said information processing device further comprises an instruction reservation station unit integrally controlling execution of an instruction to process sequentially given instructions in an out-of-order system.

14. The apparatus according to claim 13, wherein:

said branch reservation station unit comprises a plurality of entries storing the branch instruction or necessary data for execution of a process relating to a branch;

an entry is generated according to an instruction execution order when an instruction is decoded, the entry stores an instruction identifier specified by said instruction reservation station unit and identifying a decoded instruction; and when a branch process for a generated entry is completed, said branch reservation station unit reports to said instruction reservation station unit that the branch process has been completed with a determination result as to whether a branch is selected/not selected and the instruction identifier in an instruction execution order, and then removes an entry corresponding to an instruction whose branch process has been completed.

15. The apparatus according to claim 14, further comprising an instruction speculative execution unit speculatively executing a non-branch subsequent instruction subsequent to the decoded instruction when it is not certain whether a branch is selected/not selected when the instruction is decoded, and wherein when it is necessary to nullify an instruction execution result by said instruction speculative execution unit, said branch reservation station unit further reports data indicating that it is necessary to nullify the result to said instruction reservation station unit.

16. The apparatus according to claim 14, further comprising:

a branch selection/non-selection prediction unit predicting whether a branch is selected/not selected when a branch instruction is decoded;

an instruction speculative execution unit speculatively executing instructions subsequent to the branch instruction according to the prediction result from said branch selection/non-selection prediction unit; and an instruction re-execution unit nullifying an instruction execution result obtained by said instruction speculative execution unit when there arises inconsistency between a prediction by said branch selection/non-selection prediction unit and an actual determination result as to whether a branch is selected/not selected, and executing an instruction corresponding to the actual determination result, wherein when it is necessary to nullify an instruction execution result by said instruction speculative execution unit, said branch reservation station unit further reports data indicating that it is necessary to nullify the result to said instruction reservation station unit.

17. The apparatus according to claim 1, further comprising an instruction speculative execution unit speculatively executing a non-branch subsequent instruction subsequent to the decoded instruction when it is not certain whether a branch is selected/not selected when the instruction is decoded, and wherein:

said branch reservation station unit comprises a plurality of entries storing the branch instruction or necessary data for execution of a process relating to a branch;

an entry is generated in an instruction execution order when an instruction is decoded; and when it is necessary to nullify an instruction execution result by said instruction speculative execution unit, an entry generated as a result of executing an instruction by said instruction speculative execution unit is immediately removed.

18. The apparatus according to claim 1, further comprising:

a branch selection/non-selection prediction unit predicting whether a branch is selected/not selected when a branch instruction is decoded; and an instruction speculative execution unit speculatively executing instructions subsequent to the branch instruction according to the prediction result from said branch selection/non-selection prediction unit, wherein:

said branch reservation station unit comprises a plurality of entries storing the branch instruction or necessary data for execution of a process relating to a branch;

an entry is generated in an instruction execution order when an instruction is decoded; and when it is necessary to nullify an instruction execution result by said instruction speculative execution unit, an entry generated as a result of executing an instruction by said instruction speculative execution unit is immediately removed.

19. The apparatus according to claim 1, further comprising a branch selection/non-selection prediction unit predicting whether a branch is selected/not selected when a branch instruction is decoded, wherein:

when a branch process for an entry generated in said branch reservation station unit is completed, said branch reservation station unit determines whether a branch is selected/not selected, and reports a branched-to address when a branch is selected and a matching/non-matching result between the prediction and an actual branch determination result to said branch selection/non-selection prediction unit; and said branch selection/non-selection prediction unit updates data for a prediction stored in said unit according to the report result.

20. A branch instruction execution control device which controls execution of a branch instruction in an information process apparatus executing sequentially given instruction, comprising:

instruction determination means for determining whether or not an instruction is a branch instruction, and whether or not a process relating to a branch is required as a result of decoding the instruction; and branch reservation station means for generating an entry storing the branch instruction or data needed to perform the process relating to the branch when it is determined that the instruction is a branch instruction or that the process relating to the branch is required as a result of the determination, where the process needed to execute the branch instruction can be performed in accordance with data stored in each entry and independently of instruction order, and when instruction processing is completed in said branch reservation station means, one entry or a plurality of entries are simultaneously released in an execution order of branch instructions.

21. A method for controlling execution of a branch instruction in an information processing apparatus executing sequentially given instructions, comprising:

determining whether or not an instruction is a branch instruction and whether or not a process relating to a branch is required as a result of decoding the instruction; and generating an entry storing the branch instruction or data needed to perform the process relating to the branch in a branch reservation station as a stack awaiting processing when it is determined that the instruction is a branch instruction or that the process relating to the branch is required as a result of the determination, where the process needed to execute the branch instruction can be performed in accordance with data stored in each entry and independently of instruction order, and when instruction processing is completed in said branch reservation station unit, one entry or a plurality of entries are simultaneously released in an execution order of branch instructions.

22. A branch instruction execution control apparatus which controls execution of a branch instruction in an information processing device executing sequentially given instructions, comprising:

as instruction determination unit determining whether an instruction is a branch instruction, and whether a process is required relating to a branch, as a result of decoding the instruction;

a branch reservation station unit generating an entry storing the branch instruction or necessary data for performing the process relating to the branch when it is determined that the instruction is a branch instruction or that the process relating to the branch is required as a result of the determination;

a precedent instruction identifier storage unit storing an identifier of a precedent instruction preceding an instruction to be decoded, and having an influence on whether a branch is selected for the instruction to be decoded;

an identifier valid flag storage unit storing a flag indicating that the precedent instruction has not been completely executed and the identifier stored in said precedent instruction identifier storage unit is valid; and a control unit making said identifier valid flag storage unit store the flag when the execution of the precedent instruction is started, making said precedent instruction identifier storage unit store the identifier of the precedent instruction, comparing an instruction identifier contained in a completion report of the precedent instruction with the identifier stored in said precedent instruction identifier storage unit when the precedent instruction is completely executed, recognizing completion of the precedent instruction, and resetting the flag stored in said identifier valid flag storage unit.

23. The apparatus according to claim 22, wherein said branch reservation station unit comprises a storage area storing a flag indicating whether a branch is determined and a flag indicating whether a branch is selected, and wherein, if selection/non-selection of the branch is certain when the instruction is decoded, the entry generated by said branch reservation station unit stores values of a flag indicating a determination of a branch and a flag indicating whether the branch is selected, and if selection/non-selection of the branch is not certain when the instruction is decoded, the entry stores a flag indicating that the branch is uncertain.

24. The apparatus according to claim 23, wherein if selection/non-selection of the branch is not certain when the instruction is decoded, a flag indicating whether the branch is selected is stored corresponding to a determination result when it can be determined whether the branch is selected regardless of an execution order of instructions.

25. The apparatus according to claim 23, wherein if an instruction preceding the instruction to be decoded and having an influence on whether a branch is selected for the instruction to be decoded has not been completely executed when the instruction is decoded, the entry stores data indicating that the precedent instruction has not been completely executed and data identifying the precedent instruction, in said precedent instruction identifier storage unit and said identifier valid flag storage unit.

26. The apparatus according to claim 25, wherein if it can be determined upon completion of execution of the precedent instruction whether the branch is selected regardless of an execution order of instructions, a flag indicating whether the branch is selected is stored corresponding to a determination result.

27. The apparatus according to claim 26, wherein said branch reservation station unit detects the completion of the execution of the precedent instruction using the data stored in said branch reservation station unit and identifying the precedent instruction.

28. The apparatus according to claim 23, further comprising:

a branch selection prediction unit predicting whether a branch is selected when a branch instruction is decoded, and providing said branch reservation station unit with a prediction result as a value to be stored in the entry, of a flag indicating whether a branch is selected;

an instruction speculative execution unit speculatively executing instructions subsequent to the branch instruction according to the prediction result from said branch selection prediction unit; and an instruction re-execution unit nullifying an instruction execution result obtained by said instruction speculative execution unit when there arises inconsistency between a value of a flag stored in said branch reservation unit, indicating whether a branch is selected and an actual determination result as to whether a branch is selected, and executing an instruction corresponding to the actual determination result.

29. The apparatus according to claim 23, further comprising:

a branch selection prediction unit predicting whether a branch is selected when a branch instruction is decoded, and providing said branch reservation station unit with a prediction result as a value to be stored in the entry, of a flag indicating whether a branch is selected, and making an entry generated in said branch reservation station unit store a predicted value of a branched-to address when selection of a branch is predicted;

an instruction speculative execution unit speculatively executing instructions subsequent to the branch instruction according to the prediction result from said branch selection prediction unit; and an instruction re-execution unit nullifying an instruction execution result obtained by said instruction speculative execution unit when a predicted value of a branched-to address stored in said branch reservation station unit does not match an actually obtained branched-to address, and executing instructions subsequent to the actually obtained branched-to address.

30. A branch instruction execution control apparatus which controls execution of a branch instruction in an information processing device executing sequentially given instructions, comprising:

an instruction determination unit determining whether an instruction is a branch instruction and whether a process is required relating to a branch, as a result of decoding the instruction; and a branch reservation station unit generating an entry storing the branch instruction or necessary data for performing the process relating to the branch when it is determined that the instruction is a branch instruction or that the process relating to the branch is required as a result of the determination, said branch reservation station unit including a storage area storing a flag indicating whether a branch is determined and a flag indicating whether a branch is selected; and if selection/non-selection of the branch is certain when the instruction is decoded, the entry stores values of a flag indicating a determination of a branch and a flag indicating whether the branch is selected, and if selection/non-selection of the branch is not certain when the instruction is decoded, the entry stores a value of a flag indicating that the branch is uncertain.

31. The apparatus according to claim 30, wherein an indication of whether selection/non-selection of the branch is not certain is stored corresponding to a determination result when it can be determined whether the branch is selected regardless of an execution order of instructions.

32. The apparatus according to claim 30, wherein when an instruction preceding the instruction to be decoded and having an influence on whether a branch is selected for the instruction to be decoded has not been completely executed, the entry stores data indicating that the precedent instruction has not been completely executed and data identifying the precedent instruction.

33. The apparatus to according claim 32, wherein if it can be determined upon completion of execution of the precedent instruction whether the branch is selected regardless of an execution order of instructions, a flag indicating whether the branch is selected is stored corresponding to a determination result.

34. The apparatus according to claim 33, wherein said branch reservation station unit detects the completion of the execution of the precedent instruction using the data stored in said branch reservation station unit and identifying the precedent instruction.

35. The apparatus according to claim 30, further comprising:

a branch selection prediction unit predicting whether a branch is selected when a branch instruction is decoded, and providing said branch reservation station unit with a prediction result as a value to be stored in the entry, of a flag indicating whether a branch is selected, an instruction speculative execution unit speculatively executing instructions subsequent to the branch instruction according to the prediction result from said branch selection prediction, unit; and an instruction re-execution unit nullifying an instruction speculative execution unit when there arises inconsistency between a value of a flag stored in said branch reservation station unit, indicating whether a branch is selected, and an actual determination result as to whether a branch is selected, and executing an instruction corresponding to the actual determination result.

36. The apparatus according to claim 30, further comprising:

a branch selection prediction unit predicting whether a branch is selected when a branch instruction is decoded, and providing said branch reservation station unit with a prediction result as a value to be stored in the entry, of a flag indicating whether a branch is selected, and making an entry generated in said branch reservation station unit store a predicted value of a branched-to address when selection of a branch is predicted;

an instruction speculative execution unit speculatively executing instructions subsequent to the branch instruction according to the prediction result from said branch selection prediction unit; and an instruction re-execution unit nullifying an instruction execution result obtained by said instruction speculative execution unit when a predicted value of a branched-to address stored in said branch reservation station unit does not match an actually obtained branched-to address, and executing instructions subsequent to the actually obtained branched-to address.

37. A branch instruction execution control apparatus which controls execution of a branch instruction in an information processing device executing sequentially given instructions, comprising:

an instruction determination unit determining whether an instruction is a branch instruction and whether a process is required relating to a branch, as a result of decoding the instruction;

a branch reservation station unit generating an entry storing necessary data for performing the branch instruction or a process relating to the branch when it is determined that the instruction is a branch instruction or that the process relating to the branch is required as a result of the determination;

an instruction reservation station unit integrally controlling execution of an instruction to process sequentially given instructions in an out of-order system; and an instruction speculative execution unit speculatively executing a non-branch subsequent instruction subsequent to the decoded instruction if it is not certain whether a branch is selected when the instruction is decoded, where an entry is generated according to an instruction execution order when an instruction is decoded, the entry stores an instruction identifier specified by said instruction reservation station unit and identifies a decoded instruction, and when a branch process for a generated entry is completed, said branch reservation station unit reports to said instruction reservation station unit that the branch process has been completed with a determination result as to whether a branch is selected and the instruction identifier in an instruction execution order, and then removes an entry corresponding to an instruction whose branch process has been completed, and if it is necessary to nullify an instruction execution result by said instruction speculative execution unit, said branch reservation station unit further reports data indicating that it is necessary to nullify the result to said instruction reservation instruction unit.

38. A branch instruction execution control apparatus which controls execution of a branch instruction in an information processing device executing sequentially given instructions, comprising:

an instruction determination unit determining whether an instruction is a branch instruction and whether a process is required relating to a branch, as a result of decoding the instruction;

a branch reservation station unit generating an entry storing the branch instruction or necessary data for performing the process relating to the branch when it is determined that the instruction is a branch instruction or that the process relating to the branch is required as a result of the determination;

an instruction reservation station unit integrally controlling execution of an instruction to process sequentially given instructions in an out-of-order system, a branch selection prediction unit predicting whether a branch is selected when a branch instruction is decoded;

an instruction speculative execution unit speculatively executing instructions subsequent to the branch instruction according to the prediction result from said branch selection prediction unit; and an instruction re-execution unit nullifying an instruction execution result obtained by said instruction speculative execution unit when there arises inconsistency between a prediction by said branch selection prediction unit and an actual determination result as to whether a branch is selected, and executing an instruction corresponding to the actual determination result, where an entry is generated according to an instruction execution order when an instruction is decoded, the entry stores an instruction identifier specified by said instruction reservation station unit and identifies a decoded instruction, and when a branch process for a generated entry is completed, said branch reservation station unit reports to said instruction reservation station unit that the branch process has been completed with a determination result as to whether a branch is selected and the instruction identifier in an instruction execution order, and then removes an entry corresponding to an instruction whose branch process has been completed, and if it is necessary to nullify an instruction execution result by said instruction speculative execution unit, said branch reservation station unit further reports data indicating that it is necessary to nullify the result to said instruction reservation station unit.

* * * * *

UNITED STATES PATENT AND TRADEMARK OFFICE
CERTIFICATE OF CORRECTION

PATENT NO.    : 6,851,043 B1
DATED         : February 1, 2005
INVENTOR(S)   : Aiichiro Inoue It is certified that error appears in the above-identified patent and that said Letters Patent is hereby corrected as shown below:

Column 37,
Line 53, "to according" should be -- according to --;

Column 38,
Line 4, "," should be -- . --;
Line 55, "out of-order" should be -- out-of-order --.

Signed and Sealed this

Seventeenth Day of January, 2006

JON W. DUDAS
*Director of the United States Patent and Trademark Office*